United States Patent
Kim et al.

(10) Patent No.: US 9,614,655 B2
(45) Date of Patent: Apr. 4, 2017

(54) METHOD AND APPARATUS FOR FEEDING BACK CHANNEL STATE INFORMATION IN WIRELESS COMMUNICATION SYSTEM

(71) Applicant: LG ELECTRONICS INC., Seoul (KR)

(72) Inventors: Hyungtae Kim, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 3 days.

(21) Appl. No.: 14/418,051

(22) PCT Filed: Aug. 2, 2013

(86) PCT No.: PCT/KR2013/006992
§ 371 (c)(1),
(2) Date: Jan. 28, 2015

(87) PCT Pub. No.: WO2014/021677
PCT Pub. Date: Feb. 6, 2014

(65) Prior Publication Data
US 2015/0172024 A1    Jun. 18, 2015

Related U.S. Application Data

(60) Provisional application No. 61/679,066, filed on Aug. 2, 2012.

(51) Int. Cl.
*H04L 5/00* (2006.01)
*H04B 7/06* (2006.01)
(Continued)

(52) U.S. Cl.
CPC .......... *H04L 5/0053* (2013.01); *H04B 7/024* (2013.01); *H04B 7/0486* (2013.01);
(Continued)

(58) Field of Classification Search
CPC ...... H04B 7/024; H04B 7/0417; H04B 7/626; H04B 7/0632; H04B 7/0634;
(Continued)

(56) References Cited

U.S. PATENT DOCUMENTS

| 2009/0190528 A1* | 7/2009 | Chung ................. H04B 7/0417 370/328 |
| 2012/0188904 A1 | 7/2012 | Koo et al. |

(Continued)

OTHER PUBLICATIONS

CATT, "On CSI feedback modes for CoMP," 3GPP TSG RAN WG1 Meeting #69, May 21-25, 2012, 6 pages, R1-122039.
(Continued)

*Primary Examiner* — Stephen J Clawson
(74) *Attorney, Agent, or Firm* — Birch, Stewart, Kolasch & Birch, LLP

(57) ABSTRACT

The present invention relates to a wireless communication system. The method for transmitting channel state information (CSI) on a plurality of base stations by means of a terminal in a wireless communication system according to one embodiment of the present invention comprises: a step of receiving N-number of CSI configurations for a CSI report; a step of receiving information indicating M-number (wherein, 2≤M≤N) of CSI configurations which use a common CSI among the N-number of CSI configurations; and a step of transmitting the common CSI based on one CSI configuration selected from among the M-number of CSI configurations to transmit the common CSI.

4 Claims, 21 Drawing Sheets

(51) Int. Cl.
*H04B 7/024* (2017.01)
*H04B 7/04* (2017.01)
*H04W 72/04* (2009.01)
*H04B 7/0417* (2017.01)
*H04W 88/02* (2009.01)
*H04W 88/08* (2009.01)

(52) U.S. Cl.
CPC ......... *H04B 7/0626* (2013.01); *H04L 5/0032* (2013.01); *H04W 72/0413* (2013.01); *H04B 7/0417* (2013.01); *H04B 7/0632* (2013.01); *H04B 7/0634* (2013.01); *H04B 7/0639* (2013.01); *H04W 88/02* (2013.01); *H04W 88/08* (2013.01)

(58) Field of Classification Search
CPC ............... H04B 7/0639; H04L 5/0032; H04W 72/0413; H04W 88/02; H04W 88/08
USPC ......................................................... 370/329
See application file for complete search history.

(56) References Cited

U.S. PATENT DOCUMENTS

2012/0257515 A1* 10/2012 Hugl ..................... H04W 24/10
370/252
2013/0195025 A1* 8/2013 Chatterjee ........... H04W 72/085
370/329

OTHER PUBLICATIONS

Fujitsu, "Email discussion [69-10]: Details of collision handling and compression/multiplexing in case of 2 or more CSIs being configured in the same reporting instance for CoMP CSI feedback," 3GPP TSG RAN WG1 Meeting #69, May 21-25, 2012, pp. 1-30, R1-122930.

Intel Corporation, "Unified CSI feedback framework for CoMP schemes," 3GPP TSG-RAN WG1 #67, Nov. 14-18, 2011, 3 pages, R1-113663.

LG Electronics, "Consideration on CSI feedback for CoMP and feedback container," 3GPP TSG RAN WG1 Meeting #67, Nov. 14-18, 2011, 5 pages, R1-113982.

* cited by examiner

FIG. 1 --Prior Art--
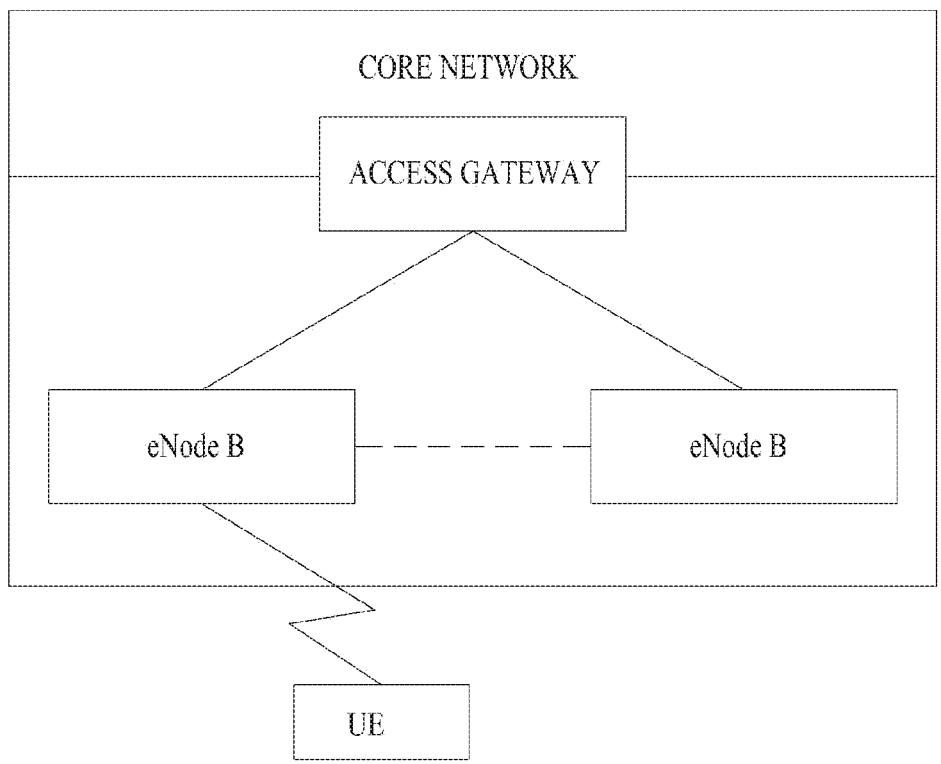

FIG. 2 —Prior Art—
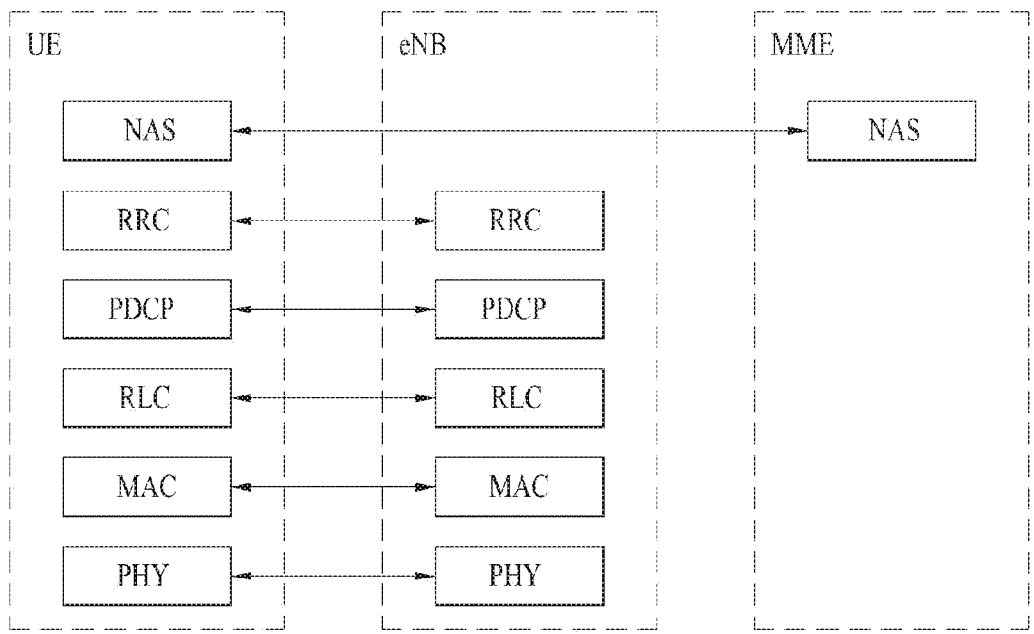
(A) CONTROL-PLANE PROTOCOL STACK
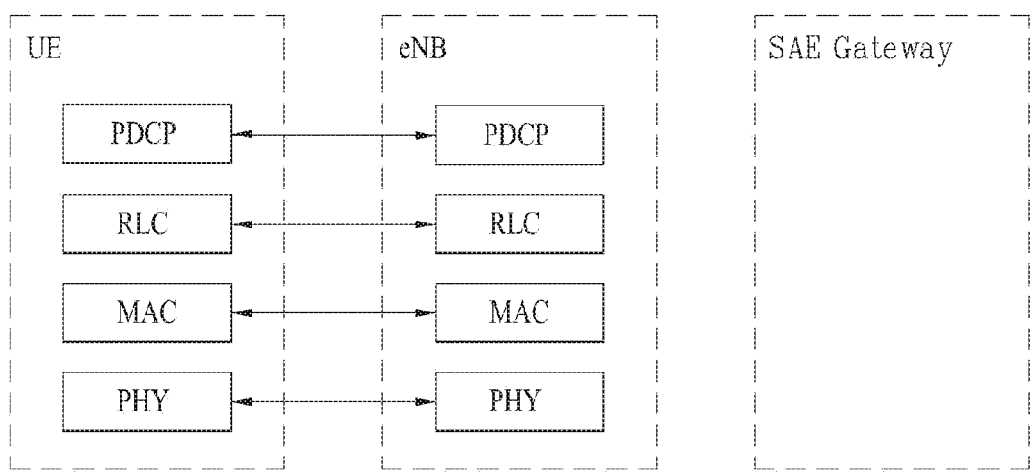
(B) USER-PLANE PROTOCOL STACK

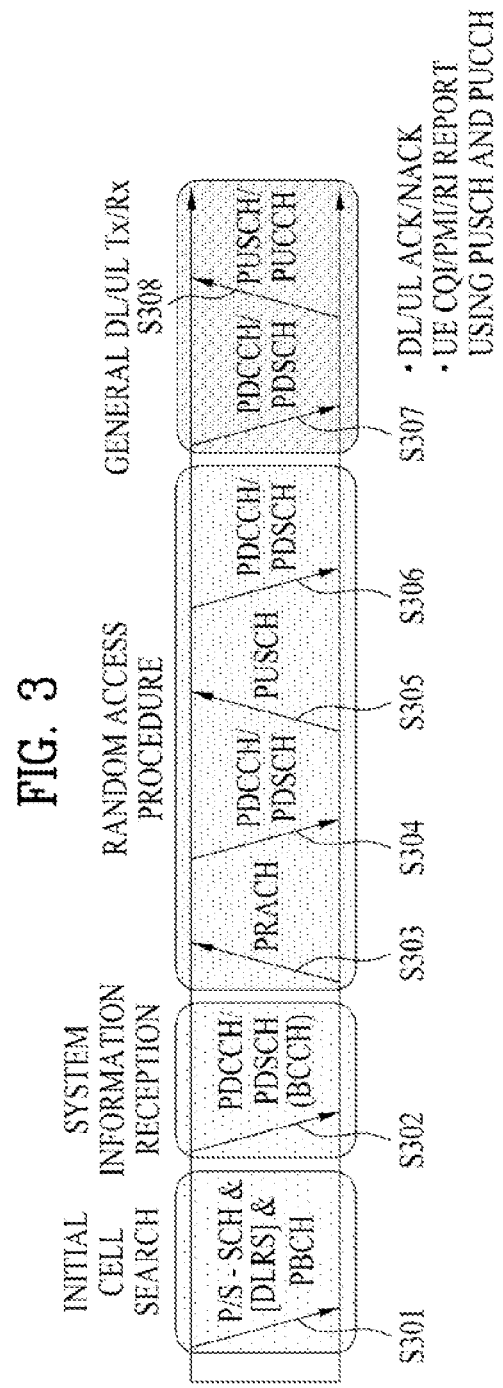

| CQI REPORTING MODE | | PMI FEEDBACK TYPE | |
|---|---|---|---|
| | | NO PMI | SINGLE PMI |
| PUCCH CQI FEEDBACK TYPE | WIDEBAND (WIDEBAND CQI) | MODE 1-0 | MODE 1-1 |
| | UE-SELECTED (SUBBAND CQI) | MODE 2-0 | MODE 2-1 |

FIG. 14
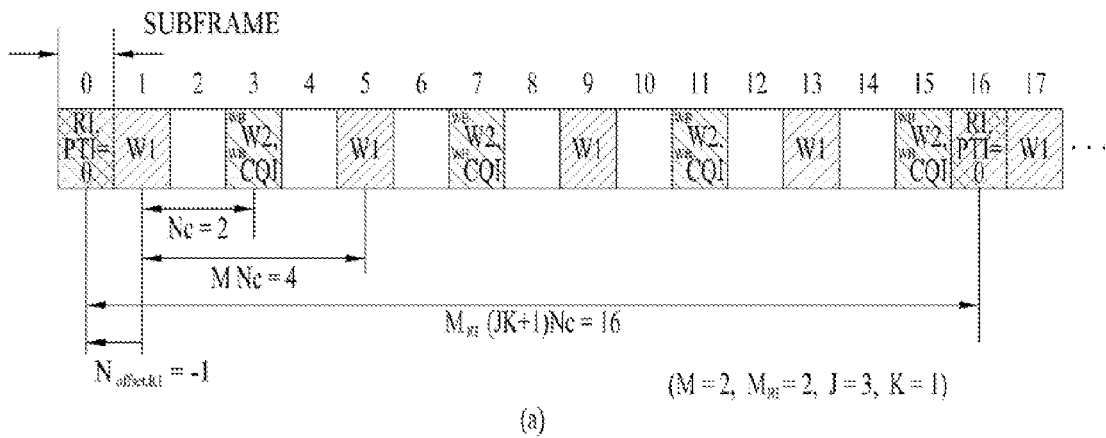
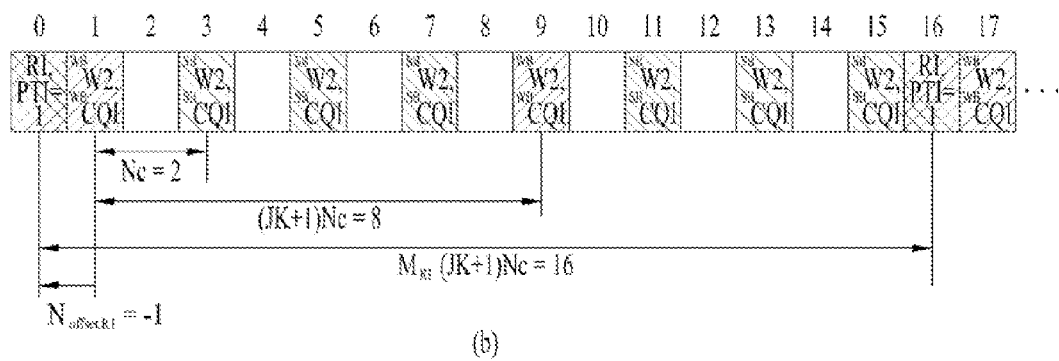
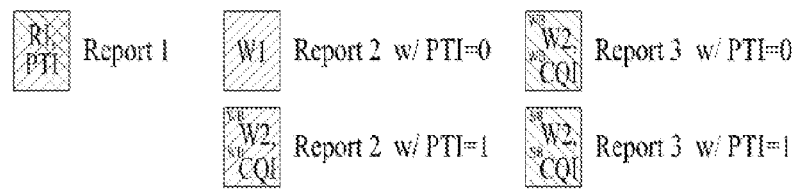

METHOD AND APPARATUS FOR FEEDING BACK CHANNEL STATE INFORMATION IN WIRELESS COMMUNICATION SYSTEM

CROSS REFERENCE TO RELATED APPLICATIONS

This application is the National Phase of PCT International Application No. PCT/KR2013/006992, filed on Aug. 2, 2013, which claims priority under 35 U.S.C. 119(e) to U.S. Provisional Application No. 61/679,066, filed on Aug. 2, 2012, all of which are hereby expressly incorporated by reference into the present application.

FIELD OF THE INVENTION

The present invention relates to wireless communication systems, and more particularly, to a method for feeding back channel state information in a wireless communication system and an apparatus therefor.

BACKGROUND ART

As an example of a wireless communication system to which the present invention is applicable, a 3rd Generation Partnership Project Long Term Evolution (3GPP LTE) (hereinafter, referred to as 'LTE') communication system is briefly described.

FIG. 1 is a view schematically illustrating the network architecture of an E-UMTS as an exemplary wireless communication system. An Evolved Universal Mobile Telecommunications System (E-UMTS) is an advanced version of a legacy Universal Mobile Telecommunications System (UMTS) and standardization thereof is currently underway in the 3GPP. E-UMTS may be generally referred to as an LTE system. For details of the technical specifications of UMTS and E-UMTS, reference can respectively be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of a network (Evolved-Universal Terrestrial Radio Access Network ((E-UTRAN)) and connected to an external network. The eNBs may simultaneously transmit multiple data streams for a broadcast service, a multicast service, and/or a unicast service.

One or more cells may exist in one eNB. A cell is configured to use one of bandwidths of 1.25, 2.5, 5, 10, 20 MHz to provide a downlink or uplink transport service to several UEs. Different cells may be configured to provide different bandwidths. The eNB controls data transmission and reception for a plurality of UEs. The eNB transmits downlink scheduling information for downlink data to notify a corresponding UE of a data transmission time/frequency domain, coding, data size, and Hybrid Automatic Repeat and reQuest (HARQ)-related information. In addition, the eNB transmits uplink scheduling information for uplink data to inform a corresponding UE of available time/frequency domains, coding, data size, and HARQ-related information. An interface for transmitting user traffic or control traffic may be used between eNBs. A Core Network (CN) may include an AG and a network node for user registration of the UE. The AG manages mobility of the UE on a Tracking Area (TA) basis, wherein one TA consists of a plurality of cells.

Although radio communication technology has been developed up to LTE based on Wideband Code Division Multiple Access (WCDMA), demands and expectations of users and service providers have continued to increase. In addition, since other radio access technologies continue to be developed, new technical evolution is required for future competitiveness. Decrease of cost per bit, increase of service availability, flexible use of a frequency band, simple structure and open interface, and suitable power consumption by a UE are required.

To aid in efficient management of a wireless communication system of an eNB, a UE periodically and/or aperiodically reports state information of a current channel to the eNB. Since the reported state information of the channel may include results calculated in consideration of various situations, a more efficient reporting method is needed.

DETAILED DESCRIPTION OF THE INVENTION

Technical Objects

Based upon the above-described discussion, hereinafter, a method and apparatus for reporting channel state information in a wireless communication system will be proposed.

The effects of the present invention will not be limited only to the technical objects described above. Accordingly, technical objects that have not been mentioned above or additional technical objects of the present application may become apparent to those having ordinary skill in the art from the description presented below.

Technical Solutions

In order to resolve the above-described technical objects, according to an exemplary embodiment of the present invention, a method of a user equipment for transmitting channel state information (CSI) on a plurality of base stations in a wireless communication system includes a step of receiving information on N number of CSI configurations for CSI reporting; a step of receiving information indicating M number (wherein 2≤M≤N) of CSI configurations using a common CSI among the N number of CSI configurations; and a step of transmitting the common CSI based upon one CSI configuration being selected from the M number of CSI configurations in order to transmit the common CSI.

Among the M number of CSI configurations, transmission of CSIs respective to (M−1) number of non-selected CSI configurations may be omitted.

The common CSI may be transmitted in concatenation with a CSI respective to (N−M) number of CSI configurations that do not use the common CSI.

Among the M number of CSI configurations, a CSI configuration having a smallest CSI configuration index may be selected as a CSI configuration transmitting the common CSI.

Among the M number of CSI configurations, selection information configured to indicate a CSI configuration that transmits the common CSI may be received via RRC signaling.

The common CSI information may include at least one of a common PMI (Precoding Matrix Index), a common RI (Rank Indicator), and a common subband.

According to another exemplary embodiment of the present invention, a method of a base station for receiving channel state information (CSI) on a plurality of base stations in a wireless communication system includes a step of transmitting information on N number of CSI configurations for CSI reporting; a step of transmitting information indicating M number (wherein 2≤M≤N) of CSI configurations using a common CSI among the N number of CSI configurations; and a step of receiving the common CSI based upon one CSI configuration being selected from the M number of CSI configurations in order to transmit the common CSI.

Among the M number of CSI configurations, transmission of CSIs respective to (M−1) number of non-selected CSI configurations may be omitted.

The common CSI may be transmitted in concatenation with a CSI respective to (N−M) number of CSI configurations that do not use the common CSI.

Among the M number of CSI configurations, a CSI configuration having a smallest CSI configuration index may be selected as a CSI configuration transmitting the common CSI.

Among the M number of CSI configurations, selection information configured to indicate a CSI configuration that transmits the common CSI may be received via RRC signaling.

The common CSI information may include at least one of a common PMI (Precoding Matrix Index), a common RI (Rank Indicator), and a common subband.

According to yet another exemplary embodiment of the present invention, a user equipment transmitting channel state information (CSI) on a plurality of base stations in a wireless communication system includes a RF (Radio Frequency) unit; and a processor, wherein the processor is configured to receive information on N number of CSI configurations for CSI reporting, to receive information indicating M number (wherein 2≤M≤N) of CSI configurations using a common CSI among the N number of CSI configurations, and to transmit the common CSI based upon one CSI configuration being selected from the M number of CSI configurations in order to transmit the common CSI.

According to yet another exemplary embodiment of the present invention, a base station receiving channel state information (CSI) on a plurality of base stations in a wireless communication system includes a RF (Radio Frequency) unit; and a processor, wherein the processor is configured to transmit information on N number of CSI configurations for CSI reporting, to transmit information indicating M number (wherein 2≤M≤N) of CSI configurations using a common CSI among the N number of CSI configurations, and to receive the common CSI based upon one CSI configuration being selected from the M number of CSI configurations in order to transmit the common CSI.

Advantageous Effects

According to an exemplary embodiment of the present invention, channel state information may be reported more efficiently in a wireless communication system.

The effects of the present invention will not be limited only to the effects described above. Accordingly, effects that have not been mentioned above or additional effects of the present application may become apparent to those having ordinary skill in the art from the description presented below.

BRIEF DESCRIPTION OF THE DRAWINGS

The accompanying drawings, which are included to provide a further understanding of the invention, illustrate embodiments of the invention and together with the description serve to explain the principle of the invention.

FIG. 1 schematically illustrates the network architecture of an E-UMTS as an exemplary wireless communication system;

FIG. 2 illustrates structures of a control plane and a user plane of a radio interface protocol between a UE and an E-UTRAN based on the 3GPP radio access network specification;

FIG. 3 illustrates physical channels used in a 3GPP system and a general signal transmission method using the same;

FIG. 14 illustrates a periodic reporting process of CSI when a hierarchical codebook is used;

BEST MODE

Figure 4:
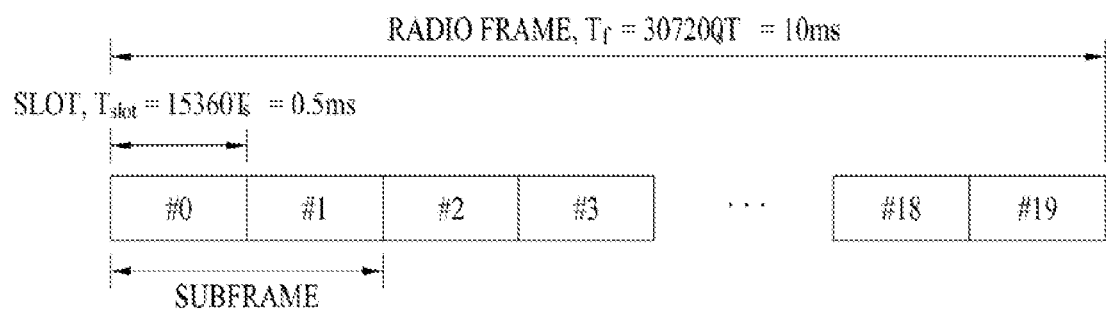
FIG. 4 illustrates the structure of a radio frame used in an LTE system.

Hereinafter, the structures, operations, and other features of the present invention will be understood readily from the embodiments of the present invention, examples of which are described with reference to the accompanying drawings. The embodiments which will be described below are examples in which the technical features of the present invention are applied to a 3GPP system.

Although the embodiments of the present invention will be described based on an LTE system and an LTE-Advanced (LTE-A) system, the LTE system and the LTE-A system are only exemplary and the embodiments of the present invention can be applied to all communication systems corresponding to the aforementioned definition. In addition, although the embodiments of the present invention will herein be described based on Frequency Division Duplex (FDD) mode, the FDD mode is only exemplary and the embodiments of the present invention can easily be modified and applied to Half-FDD (H-FDD) mode or Time Division Duplex (TDD) mode.

FIG. 2 is a view illustrating structures of a control plane and a user plane of a radio interface protocol between a UE and an E-UTRAN based on the 3GPP radio access network specification. The control plane refers to a path through which control messages used by a User Equipment (UE) and a network to manage a call are transmitted. The user plane refers to a path through which data generated in an application layer, e.g. voice data or Internet packet data, is transmitted.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A MAC layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearers refer to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of an eNB is set to use one of bandwidths such as 1.25, 2.5, 5, 10, 15, and 20 MHz to provide a downlink or uplink transmission service to a plurality of UEs. Different cells may be set to provide different bandwidths.

Downlink transport channels for data transmission from a network to a UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

FIG. 3 is a view illustrating physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of initial cell search, the UE may receive a Physical Downlink Control Channel (PDCCH) and a Physical Downlink Shared Channel (PDSCH) according to information carried on the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information, transmitted by the UE to the eNB through uplink or received by the UE from the eNB through downlink, includes a downlink/uplink ACKnowledgment/Negative ACKnowledgment (ACK/NACK) signal, a Channel Quality Indicator (CQI), a Precoding Matrix Index (PMI), a Rank Indicator (RI), and the like. In the case of the 3GPP LTE system, the UE may transmit control information such as CQI/PMI/RI through the PUSCH and/or the PUCCH.

FIG. 4 is a view illustrating the structure of a radio frame used in an LTE system.

Referring to FIG. 4, the radio frame has a length of 10 ms (327200 Ts) and includes 10 equally-sized subframes. Each of the subframes has a length of 1 ms and includes two slots. Each of the slots has a length of 0.5 ms (15360 Ts). In this case, Ts denotes sampling time and is represented by Ts=1/

(15 kHz×2048)=3.2552×10-8 (about 33 ns). Each slot includes a plurality of OFDM symbols in a time domain and includes a plurality of Resource Blocks (RBs) in a frequency domain. In the LTE system, one resource block includes 12 subcarriers×7 (or 6) OFDM symbols. A Transmission Time Interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
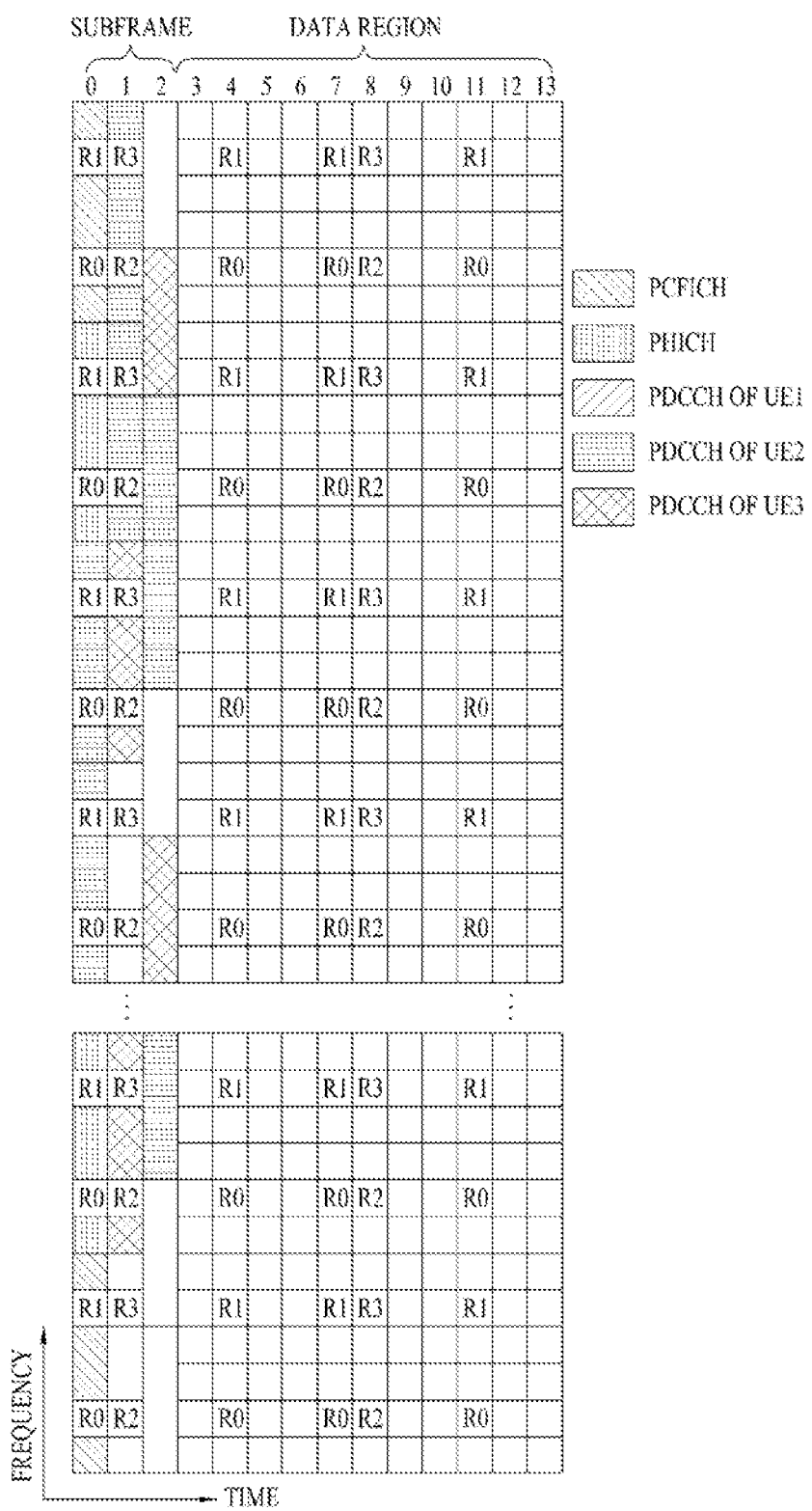
FIG. 5 illustrates the structure of a downlink radio frame used in an LTE system.

FIG. 5 is a view illustrating control channels contained in a control region of one subframe in a downlink radio frame.

Referring to FIG. 5, one subframe includes 14 OFDM symbols. The first to third ones of the 14 OFDM symbols may be used as a control region and the remaining 13 to 11 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier×one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more Control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) "A" and information about data, that is transmitted using radio resources "B" (e.g., frequency location) and transport format information "C" (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Figure 6:
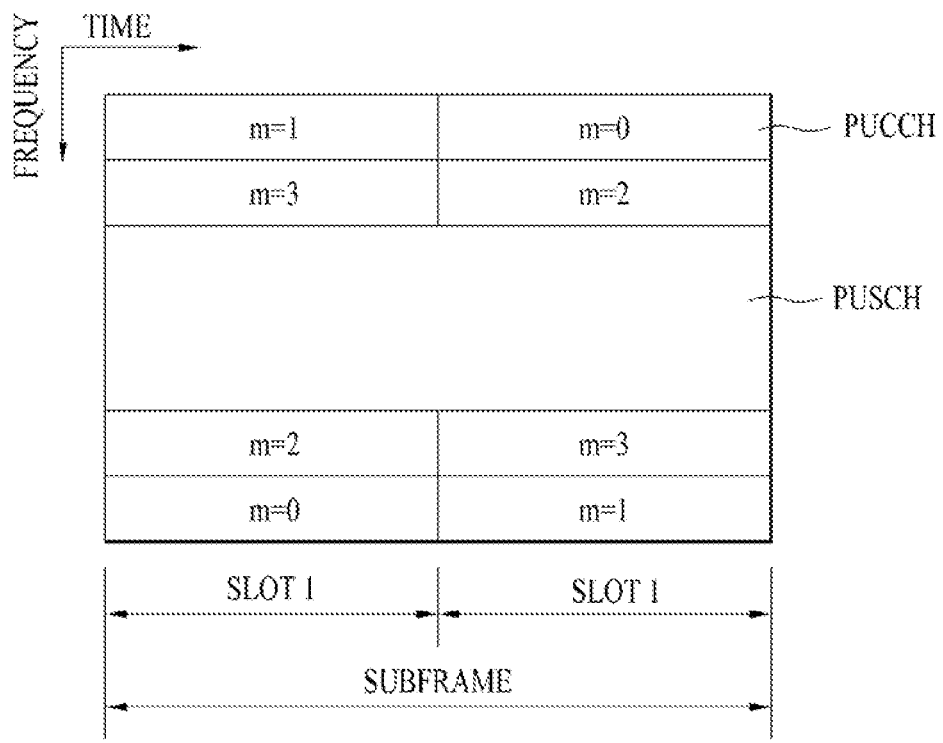
FIG. 6 illustrates the structure of an uplink subframe used in the LTE system.

FIG. 6 illustrates the structure of an uplink subframe used in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) indicating a request for allocation of uplink resources, etc. A PUCCH of a UE occupies one RB in a different frequency in each slot of a subframe. That is, two RBs allocated to the PUCCH frequency-hop over the slot boundary. Particularly, FIG. 6 illustrates an example in which PUCCHs for m=0, m=1, m=2, and m=3 are allocated to a subframe.

Hereinafter, a MIMO system will be described. MIMO refers to a method of using multiple transmission antennas and multiple reception antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO System

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 7:
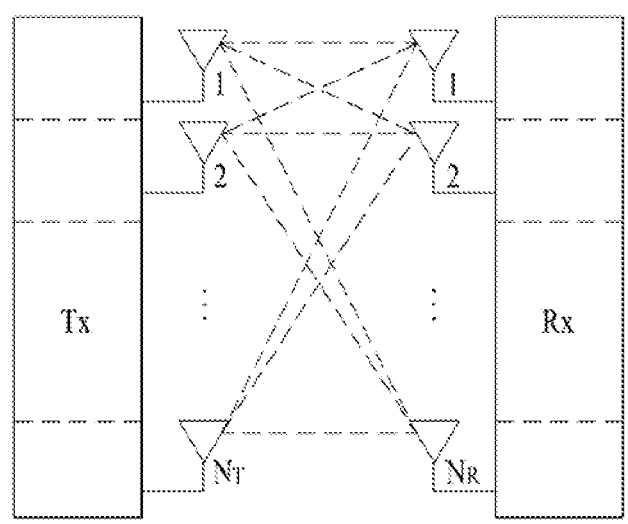
FIG. 7 illustrates the configuration of a general MIMO communication system.

The configuration of a general MIMO communication system is shown in FIG. 7. A transmitting end is equipped with NT transmission (Tx) antennas and a receiving end is equipped with NR reception (Rx) antennas. If a plurality of antennas is used both at the transmitting end and at the receiving end, theoretical channel transmission capacity increases unlike the case where only either the transmitting end or the receiving end uses a plurality of antennas. Increase in channel transmission capacity is proportional to the number of antennas, thereby improving transfer rate and frequency efficiency. If a maximum transfer rate using a signal antenna is Ro, a transfer rate using multiple antennas can be theoretically increased by the product of the maximum transfer rate Ro by a rate increment Ri. The rate increment Ri is represented by the following equation 1 where Ri is the smaller of NT and NR.

$$R_i = \min(N_T, N_R) \quad \text{[Equation 1]}$$

For example, in a MIMO communication system using four Tx antennas and four Rx antennas, it is possible to theoretically acquire a transfer rate four times that of a single antenna system. After theoretical increase in the capacity of the MIMO system was first demonstrated in the mid-1990s, various techniques for substantially improving data transfer rate have been under development. Several of these techniques have already been incorporated into a variety of wireless communication standards including, for example, 3rd generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 7, it is assumed that NT Tx antennas and NR Rx antennas are present. In the case of a transmission signal, a maximum number of transmittable pieces of information is NT under the condition that NT Tx antennas are used, so that transmission information can be represented by a vector represented by the following equation 2:

$$s = [s_1, s_2, \ldots, s_{N_T}]^T \quad \text{[Equation 2]}$$

Meanwhile, individual transmission information pieces $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3:

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector ŝ may be expressed as follows, using a diagonal matrix P of a transmission power:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

NT transmission signals $x_1, x_2, \ldots, x_{N_T}$ to be actually transmitted may be configured by multiplying the transmission power-controlled information vector ŝ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, $W_{ij}$ is a weight between the i-th Tx antenna and the j-th information and W is a weight matrix, which may also be referred to as a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns. A rank of a channel matrix H, rank(H), is restricted as follows.

$$\text{rank}(H) \leq \min(N_T, N_R) \quad \text{[Equation 6]}$$

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7:

$$\text{\# of streams} \leq \text{rank}(H) \leq \min(N_T, N_R) \quad \text{[Equation 7]}$$

where '# of streams' denotes the number of streams. It should be noted that one stream may be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid of spatial diversity and spatial multiplexing.

CSI Feedback

Now, a description of a Channel State Information (CSI) report is given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI to obtain a multiplexing gain of MIMO antennas. To obtain CSI from the UE, the eNB allocates a PUCCH or a PUSCH to command the UE to feed back CSI for a downlink signal.

CSI is divided into three types of information: a Rank Indicator (RI), a Precoding Matrix Index (PMI), and a Channel Quality Indicator (CQI). First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of Signal-to-Interference plus Noise Ratio (SINR). Lastly, CQI is information indicating the strength of a channel and indicates a reception SINR obtainable when the eNB uses PMI.

In an evolved communication system such as an LTE-A system, multi-user diversity using Multi-User MIMO (MU-MIMO) is additionally obtained. Since interference between UEs multiplexed in an antenna domain exists in the MU-MIMO scheme, CSI accuracy may greatly affect not only interference of a UE that has reported CSI but also interference of other multiplexed UEs. Hence, in order to correctly perform MU-MIMO operation, it is necessary to report CSI having accuracy higher than that of a Single User-MIMO (SU-MIMO) scheme.

Accordingly, LTE-A standard has determined that a final PMI should be separately designed into W1, which a long-term and/or wideband PMI, and W2, which is a short-term and/or subband PMI.

An example of a hierarchical codebook transform scheme configuring one final PMI from among W1 and W2 may use a long-term covariance matrix of a channel as indicated in Equation 8:

$$W = \text{norm}(W1\,W2) \quad \text{[Equation 8]}$$

In Equation 8, W2 of a short-term PMI indicates a codeword of a codebook configured to reflect short-term channel information, W denotes a codeword of a final codebook, and norm(A) indicates a matrix in which a norm of each column of a matrix A is normalized to 1.

The detailed configurations of W1 and W2 are shown in Equation 9:

$$W1(i) = \begin{bmatrix} X_i & 0 \\ 0 & X_i \end{bmatrix}, \text{ where } X_i \text{ is } Nt/2 \text{ by } M \text{ matrix.} \quad \text{[Equation 9]}$$

$$W2(j) = \overbrace{\begin{bmatrix} e_M^k & e_M^l & e_M^m \\ \alpha_j e_M^k & \beta_j e_M^l & \cdots & \gamma_j e_M^m \end{bmatrix}}^{r \text{ columns}} (\text{if rank} = r),$$

where $1 \leq k, l, m \leq M$ and $k, l, m$ are integer.

where Nt is the number of Tx antennas, M is the number of columns of a matrix Xi, indicating that the matrix Xi includes a total of M candidate column vectors. eMk, eMl, and eMm denote k-th, l-th, and m-th column vectors of the matrix Xi in which only k-th, l-th, and m-th elements among M elements are 0 and the other elements are 0, respectively. $\alpha_j$, $\beta_j$, and $\gamma_j$ are complex values each having a unit norm and indicate that, when the k-th, l-th, and m-th column vectors of the matrix Xi are selected, phase rotation is applied to the column vectors. At this time, i is an integer greater than 0, denoting a PMI index indicating W1 and j is an integer greater than 0, denoting a PMI index indicating W2.

In Equation 9, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown as follows:

$$W1(i) * W2(j) = \begin{bmatrix} X_i(k) \\ \alpha_j X_i(k) \end{bmatrix} \quad \text{[Equation 10]}$$

In Equation 10, a codeword is expressed as a vector of $N_T \times 1$ (where NT is the number of Tx antennas) and is structured with an upper vector $X_i(k)$ and a lower vector $\alpha_j X_i(k)$ which show correlation characteristics of a horizontal antenna group and a vertical antenna group, respectively. $X_i(k)$ is preferably expressed as a vector having the characteristics of linear phase increment by reflecting the characteristics of a correlation between antennas of each antenna group and may be a DFT matrix as a representative example.

As described above, CSI in the LTE system includes, but is not limited to, CQI, PMI, and RI. According to transmission mode of each UE, all or some of the CQI, PMI, and RI is transmitted. Periodic transmission of CSI is referred to as periodic reporting and transmission of CSI at the request of an eNB is referred to as aperiodic reporting. In aperiodic reporting, a request bit included in uplink scheduling information transmitted by the eNB is transmitted to the UE. Then, the UE transmits CSI considering transmission mode thereof to the eNB through an uplink data channel (PUSCH). In periodic reporting, a period of CSI and an offset at the period are signaled in the unit of subframes by a semi-static scheme through a higher-layer signal per UE. The UE transmits CSI considering transmission mode to the eNB through an uplink control channel (PUCCH). If there is uplink data in a subframe in which CSI is transmitted, the CSI is transmitted through an uplink data channel (PUSCH) together with the uplink data. The eNB transmits transmission timing information suitable for each UE to the UE in consideration of a channel state of each UE and a UE distributed situation in a cell. The transmission timing information includes a period and an offset necessary for transmitting CSI and may be transmitted to each UE through an RRC message.

FIGS. 8 to 11 illustrate periodic reporting of CSI in an LTE system.

Figures 8, 9:
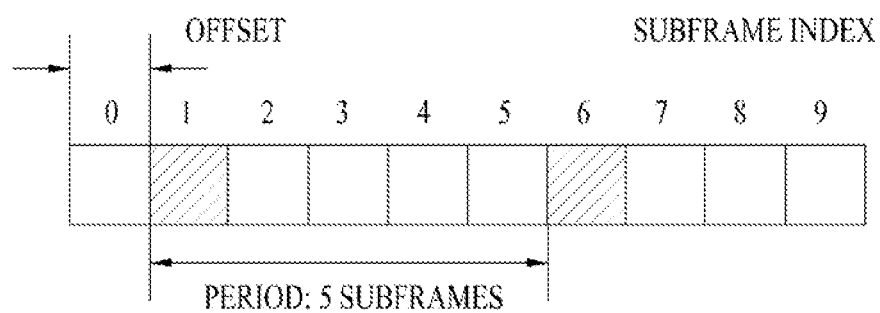
FIGS. 8 to 11 illustrate periodic reporting of CSI.

Referring to FIG. 8, there are four CQI reporting modes in the LTE system. Specifically, the CQI reporting modes may be divided into modes in a WideBand (WB) CQI and modes in a SubBand (SB) CQI according to CQI feedback type. The CQI reporting mode may also be divided into modes in a No PMI and modes in a single PMI depending on whether a PMI is transmitted or not. Each UE is informed of information comprised of a period and an offset through RRC signaling in order to periodically report CQI.

FIG. 9 illustrates an example of transmitting CSI when a UE receives information indicating {a period '5' and an offset '1'} through signaling. Referring to FIG. 9, upon receiving the information indicating the period '5' and offset '1', the UE transmits CSI in the unit of 5 subframes with an offset of one subframe in ascending order of a subframe index counted from 0 starting from the first subframe. Although the CSI is transmitted basically through a PUCCH, if a PUSCH for data transmission is present at the same transmission time point, the CSI is transmitted through the PUSCH together with data. The subframe index is given as a combination of a system frame number (or a radio frame index) nf and a slot index ns (0 to 19). Since one subframe includes two slots, the subframe index may be defined as 10×nf+floor(ns/2) wherein floor( ) indicates the floor function.

CQI transmission types include a type of transmitting a WB CQI only and a type of transmitting both a WB CQI and an SB CQI. In the type of transmitting a WB CQI only, CQI information for all bands is transmitted in subframes corresponding to every CQI transmission period. Meanwhile, in the case in which PMI information should also be transmitted according to the PMI feedback type as illustrated in FIG. 8, the PMI information is transmitted together with the CQI information. In the type of transmitting both a WB CQI and an SB CQI, the WB CQI and SB CQI are alternately transmitted.

Figure 10:
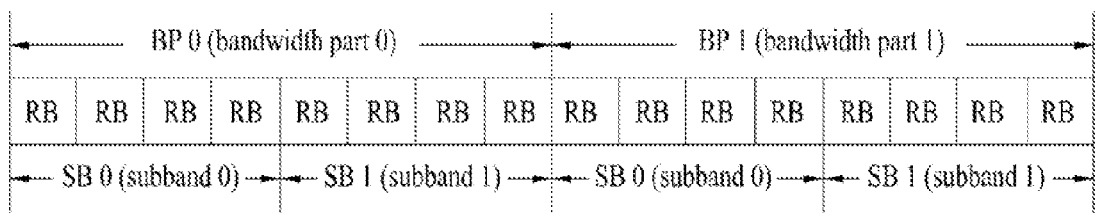
Figure 11:
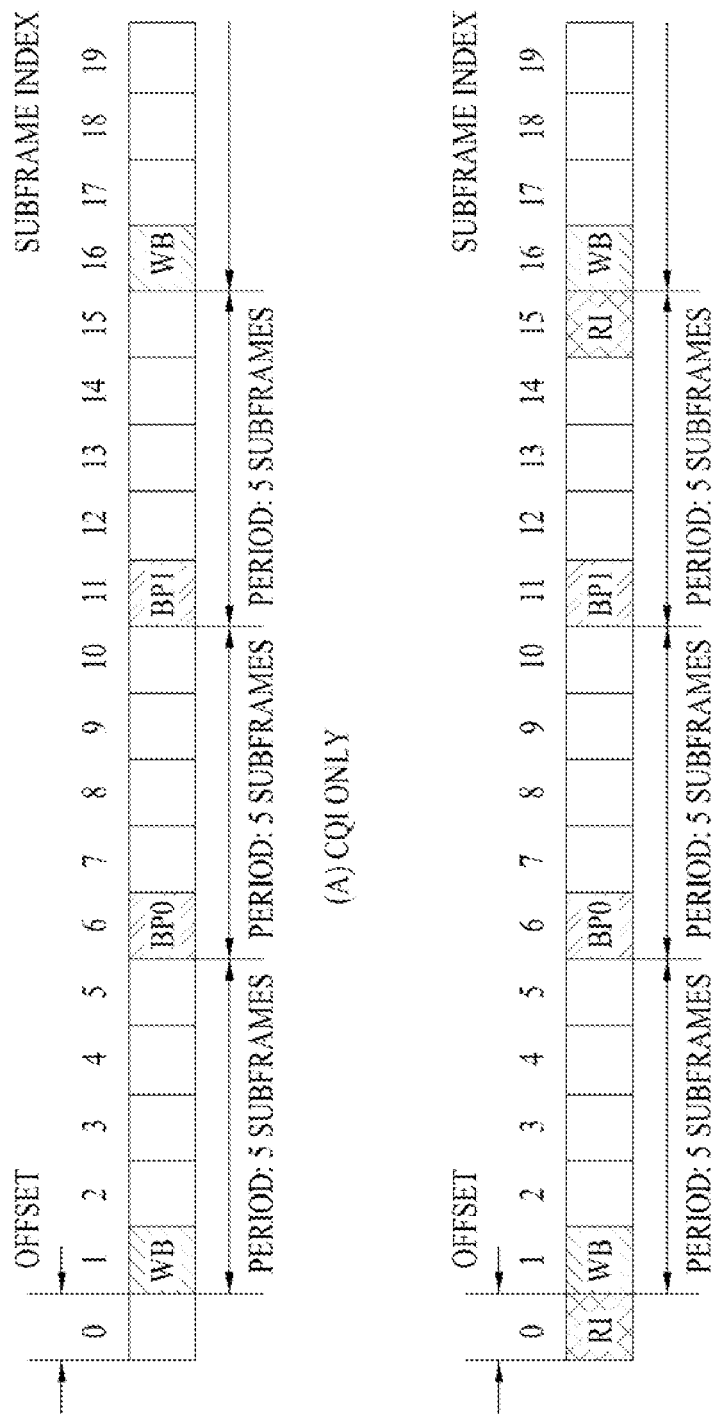

FIG. 10 illustrates a system in which a system bandwidth consists of 16 RBs. It is assumed that the system bandwidth includes two Bandwidth Parts (BPs) BP0 and BP1 each consisting of two SubBands (SBs) SB0 and SB1 and each SB includes 4 RBs. The above assumption is exemplary and the number of BPs and the size of each SB may vary with the size of the system bandwidth. The number of SBs constituting each BP may differ according to the number of RBs, the number of BPs, and the size of each SB.

In the CQI transmission type of transmitting both a WB CQI and an SB CQI, the WB CQI is transmitted in the first CQI transmission subframe and an SB CQI of the better SB state of SB0 and SB1 in BP0 is transmitted in the next CQI transmission subframe together with and an index of the corresponding SB (e.g. Subband Selection Indicator (SSI). Thereafter, an SB CQI of the better SB state of SB0 and SB1 in BP1 and an index of the corresponding SB are transmitted in the next CQI transmission subframe. Thus, CQI of each BP is sequentially transmitted after transmission of the WB CQI. The CQI of each BP may be sequentially transmitted once to four times during the interval between transmission intervals of two WB CQIs. For example, if the CQI of each BP is transmitted once during the time interval between two WB CQIs, CQIs may be transmitted in the order of WB CQI ⇒ BP0 CQI⇒ BP1 CQI⇒ WB CQI. If the CQI of each BP is transmitted four times during the time interval between two WB CQIs, CQIs may be transmitted in the order of WB CQI⇒ BP0 CQI⇒ BP1 CQI⇒ BP0 CQI⇒ BP1 CQI⇒ BP0 CQI⇒ BP1 CQI⇒ BP0 CQI⇒ BP1 CQI⇒ WB CQI. Information as to how many times each BP CQI is transmitted is signaled by a higher layer (RRC layer).

FIG. 11(a) illustrates an example of transmitting both a WB CQI and an SB CQI when a UE receives information indicating {period '5' and offset '1'} through signaling. Referring to FIG. 11(a), a CQI may be transmitted only in subframes corresponding to the signaled period and offset regardless of type. FIG. 11(b) illustrates an example of transmitting an RI in addition to the example shown in FIG. 11(a). The RI may be signaled as a combination of a multiple of a WB CQI transmission period and an offset at the transmission period from a higher layer (e.g. RRC layer). The offset of the RI is signaled using a value relative to the offset of a CQI. For example, if the offset of the CQI is '1' and the offset of the RI is '0', the RI has the same offset as the CQI. The offset value of the RI is defined as 0 or a negative number. More specifically, it is assumed in FIG. 11(b) that, in an environment identical to that of FIG. 11(a), an RI transmission period is a multiple of 1 of the WB CQI transmission period and the RI offset is '−1'. Since the RS transmission period is a multiple of 1 of the WB CQI transmission period, the RS transmission period and the WB CQI transmission period are substantially the same. Since the offset of the RI is '−1', the RI is transmitted based upon the value '−1' (i.e. subframe index 0) relative to the offset '1' of the CQI in FIG. 11(a). If the offset of the RI is '0', the transmission subframes of the WB CQI and RI overlap. In this case, the WB CQI is dropped and the RI is transmitted.

Figure 12:
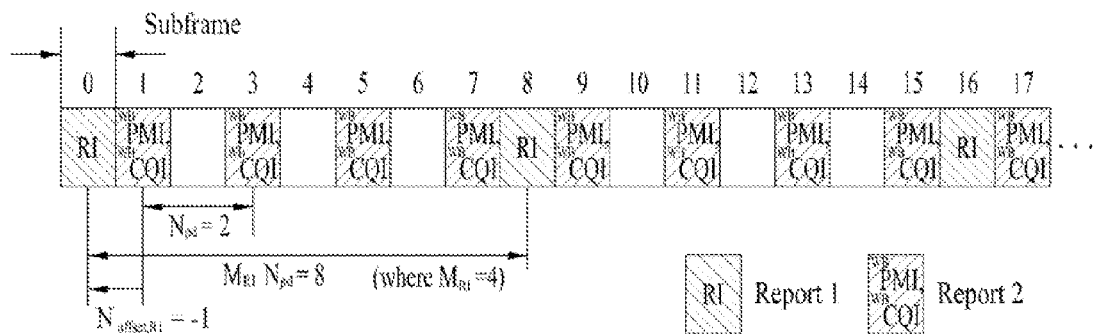
FIGS. 12 and 13 illustrate periodic reporting processes of CSI when a non-hierarchical codebook is used.

FIG. 12 illustrates CSI feedback in the case of Mode 1-1 of FIG. 8.

Referring to FIG. 12, CSI feedback is comprised of two types of report content, i.e. transmission of Report 1 and transmission of Report 2. More specifically, an RI is transmitted through Report 1 and a WB PMI and a WB CQI are transmitted through Report 2. Report 2 is transmitted in subframe indexes satisfying (10*nf+floor(ns/2)−Noffset, CQI)mod(Npd)=0. Noffset,CQI indicates an offset for PMI/CQI transmission shown in FIG. 9. In FIG. 12, Noffset, CQI=1. Npd illustrates an interval of subframes between contiguous Reports 2 and the case of Npd=2 is illustrated in FIG. 12. Report 1 is transmitted in subframe indexes satisfying (10*nf+floor(ns/2)−Noffset,CQI−Noffset,RI)mod (MRI*Npd)=0. MRI is determined by higher layer signaling. Noffset,RI denotes a relative offset value for RI transmission shown in FIG. 11. The case in which MRI=4 and Noffset,RI=−1 is illustrated in FIG. 12.

Figure 13:
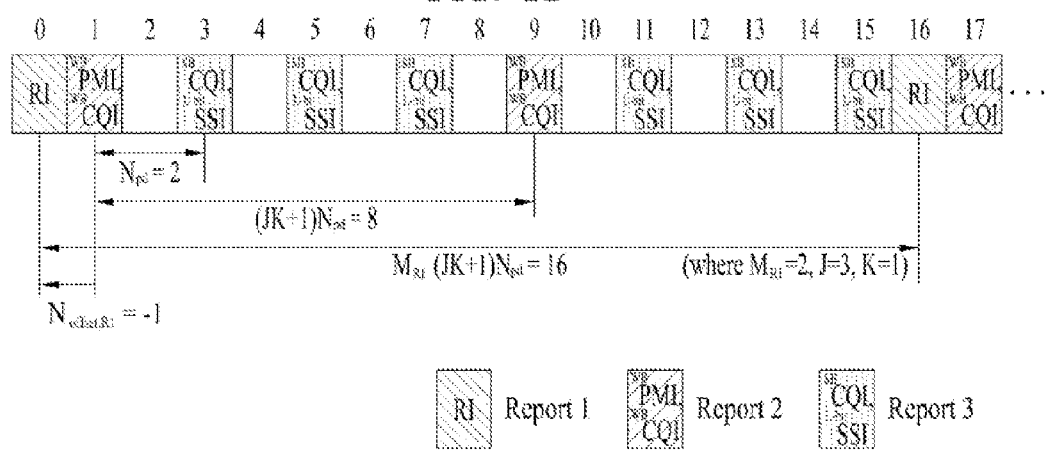

FIG. 13 illustrates CSI feedback in the case of Mode 2-1 of FIG. 8.

Referring to FIG. 13, CSI feedback is comprised of three types of report content, i.e. transmission of Report 1, transmission of Report 2, and transmission of Report 3. More specifically, an RI is transmitted through Report 1, a WB PMI and a WB CQI are transmitted through Report 2, and an SB CQI and an L-bit Subband Selection Indicator (SSI) are transmitted through Report 3. Report 2 or Report 3 is transmitted in subframe indexes satisfying (10*nf+floor(ns/2)−Noffset,CQI)mod(Npd)=0. Especially, Report 2 is transmitted in subframe indexes satisfying (10*nf+floor(ns/2)−Noffset,CQI)mod(H*Npd)=0. Accordingly, Report 2 is transmitted at an interval of H*Npd and subframes between contiguous Reports are filled with transmission of Report 3. At this time, H equals to J*K+1 wherein J is the number of BPs. K is a value indicating how many full cycles will be consecutively performed, wherein the full cycle is a cycle during which a process for selectively transmitting a subband once per different BP over all BPs. K is determined by higher layer signaling. The case in which Npd=2, J=3, and K=1 is illustrated in FIG. 13. Report 1 is transmitted in subframe indexes satisfying (10*nf+floor(ns/2)−Noff,CQI−Noffset,RI)mod(MRI*(J*K+1)*Npd)=0. The case in which MRI=2 and Noffset,RI=−1 is illustrated in FIG. 13.

FIG. 14 illustrates periodic reporting of CSI which is being discussed in LTE-A. If an eNB includes 8 Tx antennas in Mode 2-1; then a 1-bit indicator, i.e. a Precoder Type Indication (PTI) parameter, is configured and periodic reporting modes classified into two types according to the PTI value are considered. In FIG. 14, W1 and W2 illustrate hierarchical codebooks described with reference to Equations 8 and 9. If both W1 and W2 are determined, a completed type of a precoding matrix W is determined by combining W1 and W2.

Referring to FIG. 14, in the case of periodic reporting, different contents corresponding to Report 1, Report 2, and Report 3 are reported according to different repetition periods. An RI and a 1-bit PTI value are reported through Report 1. A WB W1 (when PTI=0) or a WB W2 and a WB CQI (when PTI=1) are reported through Report 2. A WB W2 and a WB CQI (when PTI=0) or an SB W2 and an SB CQI (when PTI=1) are reported through Report 3.

Report 2 and Report 3 are transmitted in subframes (for convenience, referred to as a first subframe set) having subframe indexes satisfying (10*nf+floor(ns/2)−Noffset, CQI) mod (NC)=0 wherein Noffset,CQI is an offset value for PMI/CQI transmission shown in FIG. 9 and Nc denotes a subframe interval between contiguous Reports 2 or Reports 3. The case in which Noffset,CQI=1 and Nc=2 is illustrated in FIG. 14. The first subframe set is comprised of subframes having odd-numbered indexes. nf denotes a system frame number (or radio frame index) and ns denotes a slot index in a radio frame. floor( ) indicates the floor function and 'A mod B' indicates a remainder obtained by dividing A by B.

Report 2 is located in some subframes in the first subframe set and Report 3 is located in the other subframes. More specifically, Report 2 is located in subframes having subframe indexes satisfying (10*nf+floor(ns/2)−Noffset, CQI) mod (H*Nc)=0. Accordingly, Report 2 is transmitted at an interval of H*Nc and one or more first subframes between contiguous Reports 2 are filled with transmission of Report 3. If PTI=0, then H=M and M is determined by higher layer signaling. The case in which M=2 is illustrated in FIG. 14. If PTI=1, then H=J*K+1, K is determined by higher layer signaling, and J is the number of BPs. In FIG. 14, J=3 and K=1.

Report 1 is transmitted in subframes having subframe indexes satisfying (10*nf+floor(ns/2)−Noffset,CQI-Noffset, RI) mod (MRI*(J*K+1)*Nc)=0 wherein MRI is determined by higher layer signaling. Noffset,RI indicates a relative offset value for an RI. In FIG. 14, MRI=2 and Noffset,RI=−1. The transmission time points of Report 1 and Report 2 do not overlap because Noffset,RI=−1. When a UE calculates RI, W1, and W2, they are associated with each other. For example, W1 and W2 are calculated depending on RI and W2 is calculated depending on W1. A BS may be aware of a final W from W1 and W2 when both Report 2 and Report 3 are reported after Report 1 is reported.

CSI Feedback in CoMP System

Hereinafter, Cooperative Multipoint (CoMP) transmission/reception will be described.

In a system after LTE-A, a scheme for raising system performance by enabling cooperation between a plurality of cells is attempted. Such a scheme is called CoMP transmission/reception. CoMP refers to a scheme in which two or more eNBs, access points, or cells cooperatively communicate with a UE for smooth communication between a specific UE and an eNB, an access point, or a cell. In the present invention, eNB, access point, and cell may be used interchangeably.

In general, in a multi-cell environment in which a frequency reuse factor is 1, the performance of the UE located at a cell edge and average sector throughput may be reduced due to Inter-Cell Interference (ICI). In order to reduce ICI, a legacy LTE system uses a method of enabling the UE located at a cell edge to have appropriate throughput and performance using a simple passive scheme such as Fractional Frequency Reuse (FFR) through UE-specific power control in an environment restricted by interference. However, it is desirable that ICI be reduced or the UE reuse ICI as a desired signal, rather than decreasing the use of frequency resources per cell. In order to accomplish the above purpose, a CoMP transmission scheme may be employed.

Figure 15:
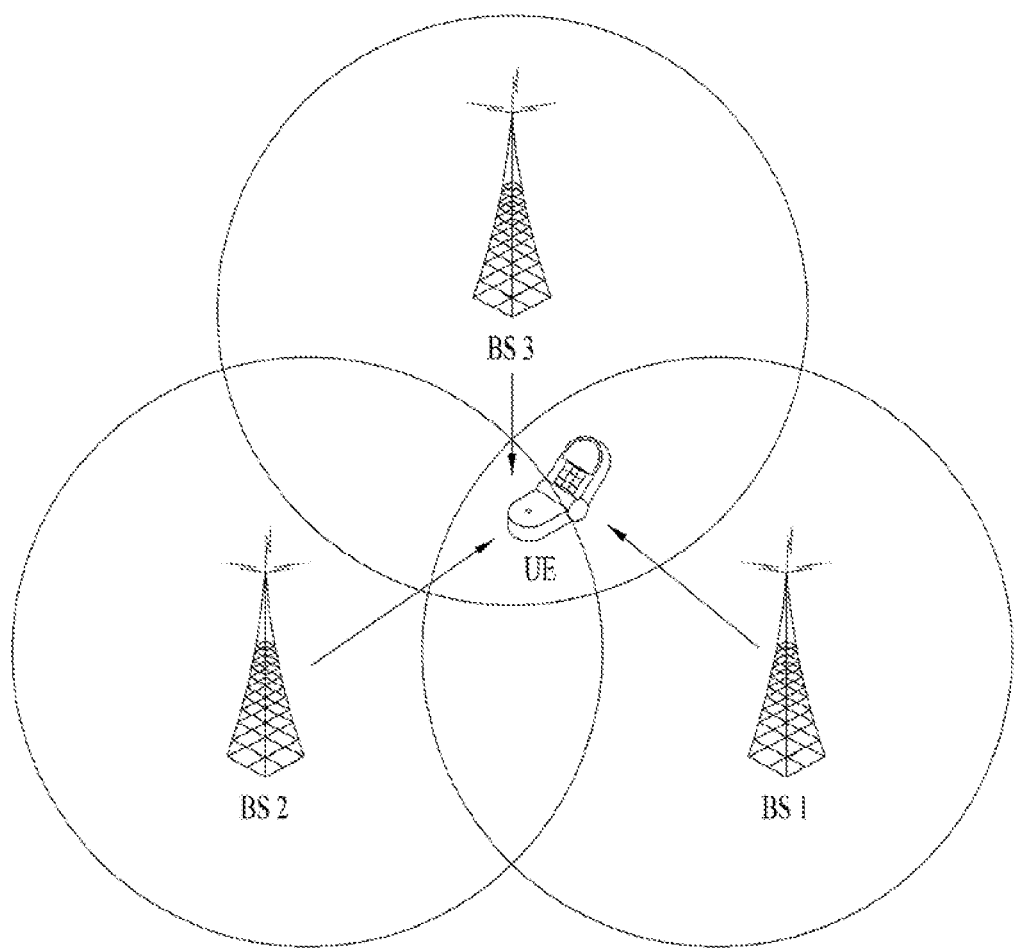
FIG. 15 illustrates an example of performing CoMP.

FIG. 15 illustrates an example of performing CoMP. Referring to FIG. 15, a radio communication system includes a plurality of eNBs eNB1, eNB2, and eNB3 that perform CoMP and a UE. The plural eNBs eNB1, eNB2, and eNB3 for performing CoMP may efficiently transmit data to the UE through cooperation.

A CoMP transmission scheme may be divided into CoMP-Joint Processing (CoMP-JP) which is a cooperative MIMO type of JP through data sharing and CoMP-Coordinated Scheduling/Coordinated Beamforming (CoMP-CS/CB).

In the case a CoMP-JP scheme in downlink, a UE may simultaneously receive data from a plurality of eNB implementing the CoMP transmission scheme and may improve reception performance by combining signals received from the respective eNBs (Joint Transmission (JT)). In addition, a method in which one of a plurality of eNBs performing the CoMP transmission scheme transmits data to the UE at a specific time point may be considered (Dynamic Point Selection (DPS). In a CoMP-CS/CB scheme in downlink, the UE may instantaneously receive data through one eNB, i.e. a serving eNB by beamforming.

If the CoMP-JP scheme is applied in uplink, a plurality of eNBs may simultaneously receive a PUSCH signal from the UE (Joint Reception (JR)). In the case of CoMP-CS/CB in uplink, only one eNB may receive a PUSCH signal. Cooperative cells (or eNBs) may determine to use the CoMP-CS/CB scheme.

A UE using the CoMP transmission scheme, i.e. a CoMP UE, may feed back channel information feedback (hereinafter, CSI feedback) to a plurality of eNBs performing the CoMP transmission scheme. A network scheduler may select a proper CoMP transmission scheme capable of raising a transmission rate among the CoMP-JP, CoMP-CS/CB, and DPS schemes based on CSI feedback. To this end, a periodic feedback transmission scheme using a PUCCH may be used as a method in which the UE configures CSI feedback in a plurality of eNBs performing the CoMP transmission scheme. In this case, feedback configurations for the eNBs may be independent of one another. Accordingly, in the disclosure according to an embodiment of the present invention, an operation of feeding back CSI with such an independent feedback configuration is referred to as a CSI process. One or more CSI processes may be performed in one serving cell.

Figure 16:
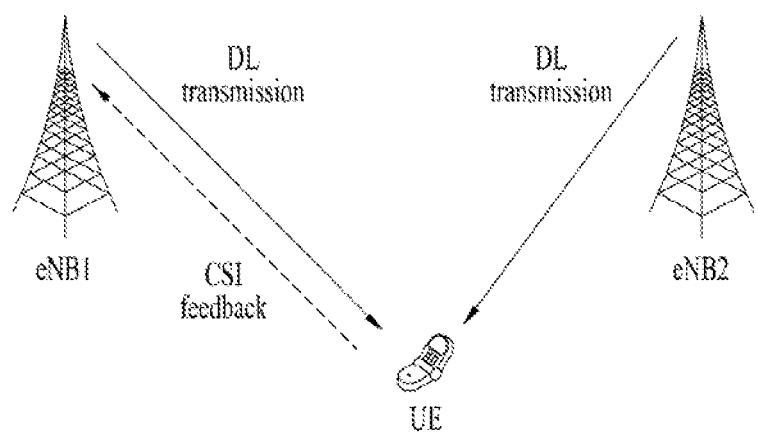
FIG. 16 illustrates a downlink CoMP operation.

FIG. 16 illustrates a downlink CoMP operation.

In FIG. 16, a UE is positioned between an eNB1 and an eNB2 and the two eNBs, i.e. eNB and eNB2, perform a proper CoMP operation such as JT, DCS, or CS/CB to solve a problem of interference to the UE. To aid in the CoMP operation of the eNBs, the UE performs proper CSI feedback. Information transmitted through CSI feedback includes PMI and CQI of each eNB and may additionally include channel information between the two eNBs (e.g. phase offset information between two eNB channels) for JT.

In FIG. 16, although the UE transmits a CSI feedback signal to the eNB1 which is a serving cell thereof, the UE may transmit the CSI feedback signal to the eNB2 or the two eNBs, according to situation. In addition, in FIG. 16, while the eNBs are described as a basic unit participating in CoMP, the present invention may be applied to CoMP between Transmission Points (TPs) controlled by a single eNB.

That is, for CoMP scheduling in a network, the UE should feed back not only downlink CSI of a serving eNB/TP but also downlink CSI of a neighboring eNB/TP. To this end, the UE feeds back a plurality of CSI processes reflecting various interference environments of eNBs/TPs for data transmission.

Accordingly, an Interference Measurement Resource (IMR) is used to measure interference during CoMP CSI calculation in an LTE system. A plurality of IMRs may be configured for one UE and each of the plural IMRs may be independently configured. That is, the period, offset, and resource configuration of the IMR are independently determined and may be signaled by an eNB to a UE using higher layer signaling (RRC etc.).

In addition, a CSI-RS is used to measure a channel desired for CoMP CSI calculation in the LTE system. A plurality of CSI-RSs may be configured for one UE and each of the CSI-RSs in independently configured. Namely, each CSI-RS includes an independently configured period, offset, resource configuration, power control, and the number of antenna ports and information related to the CSI-RS is signaled to the UE from the eNB through higher layer signaling (RRC etc.).

Among a plurality of CSI-RSs and a plurality of IMRs configured for a UE, one CSI process may be defined in association with one CSI-RS resource for signal measurement and one IMR for interference measurement. The UE feeds back CSI having different periods and subframe offsets, derived from different CSI processes, to a network (e.g. eNB).

That is, each CSI process has an independent CSI feedback configuration. The eNB may signal the CSI-RS resource, IMR association information, and CSI feedback configuration to the UE through higher layer signaling of RRC etc. on a CSI process basis. For example, it is assumed that three CSI processes as shown in Table 1 are configured for the UE.

TABLE 1

| CSI Process | Signal Measurement Resource (SMR) | IMR |
| --- | --- | --- |
| CSI process 0 | CSI-RS 0 | IMR 0 |
| CSI process 1 | CSI-RS 1 | IMR 1 |
| CSI process 2 | CSI-RS 0 | IMR 2 |

In Table 1, CSI-RS0 and CSI-RS1 indicate a CSI-RS received from an eNB 1 which is a serving eNB of the UE and a CSI-RS received from an eNB2 which is a neighboring eNB participating in cooperation. It is assumed that IMRs configured for the CSI processes of Table 1 are configured as shown in Table 2.

TABLE 2

| IMR | eNB 1 | eNB 2 |
| --- | --- | --- |
| IMR 0 | Muting | Data transmission |
| IMR 1 | Data transmission | Muting |
| IMR 2 | Muting | Muting |

In IMR 0, the eNB1 performs muting, the eNB2 performs data transmission, and the UE is configured to measure interference of eNBs except for the eNB1 from IMR 0. Similarly, in IMR 1, the eNB2 performs muting, the eNB1 performs data transmission, and the UE is configured to measure interference of eNBs except for the eNB2 from IMR 1. In addition, in IMR 2, both the eNB 1 and eNB2 perform muting and the UE is configured to measure interference of eNBs except for the eNB1 and eNB2 from IMR 2.

Accordingly, as shown in Table 1 and Table 2, CSI of CSI process 0 indicates optimal RI, PMI, and CQI when data is received from the eNB1. CSI of CSI process 1 indicates optimal RI, PMI, and CQI when data is received from the eNB2. CSI of CSI process 2 indicates optimal RI, PMI, and CQI, when data is received from the eNB1 and there is no interference from the eNB2.

In this way, it is desirable that CSI processes configured for one UE share a dependent value for the purpose of CoMP scheduling. For example, in the case of JT of a TP 1 and JT of a TP 2, if CSI process 1 considering a channel of the cell/TP 1 as a signal part and CSI process 2 considering a channel of the TP 2 as a signal part are configured for one UE, ranks and selected subband indexes of CSI process 1 and CSI process 2 should be the same to facilitate JT scheduling.

Multiple CSI Feedback Using Common CSI

Figure 17:
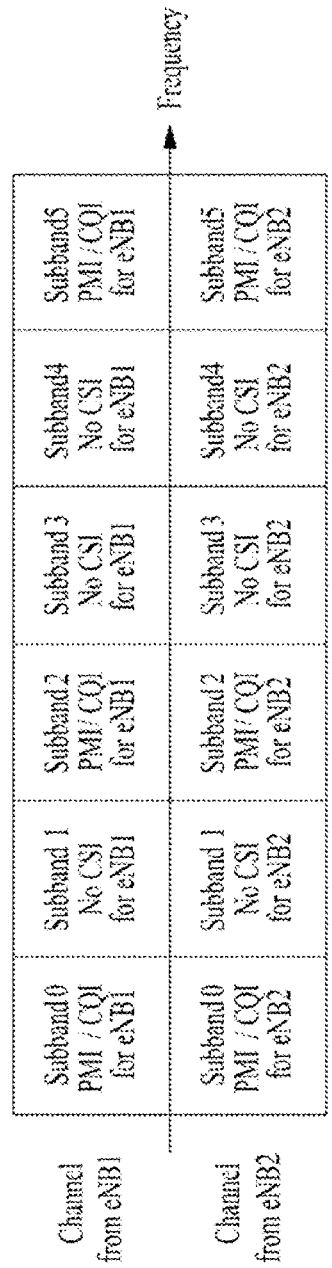
FIG. 17 illustrates multi-CSI feedback of a UE for cooperation between two eNBs.

FIG. 17 illustrates multi-CSI feedback of a UE for cooperation between two eNBs.

In FIG. 17, it is assumed that the UE performs CSI feedback per subband. The UE may divide all bandwidths into N subbands, select M subbands having a good channel state, and report PMIs and/or CQIs for the M subbands (where N and M are natural numbers, N>M).

The UE for reporting CSI for CoMP performs CSI reporting per eNB. However, since channel environments from eNBs are different, how M subbands should be selected is problematic. For example, if the UE observes a good channel from an eNB1 and a weak channel from an eNB 2, in a specific subband (e.g. subband K), it is ambiguous whether it is better to include the corresponding subband (subband K) in CSI reporting. Furthermore, since reference for selecting a subband varies with a CoMP scheme to be used by a network, the reference needs to be determined.

Referring to FIG. 17 (e.g. in the case of JT), since a UE simultaneously receives a signal thereof from two eNBs, the UE may preferably select M subbands indicating good quality of channels combined from the two eNBs. If the subbands selected by the UE for the two eNBs are not equal, a specific subband may frequently have only PMI/CQI for a channel of one of the two eNBs and, therefore, effective JT cannot be performed.

Accordingly, the UE may be configured to select M common subbands and report PMIs/CQIs for the two eNBs with respect to the selected subbands. That is, the UE may identically configure a set of subbands in which the UE reports PMIs/CQIs for the two eNBs. For example, the UE may select subbands 0, 2, and 5 for channels of the eNB1 and eNB2 and report PMI/CQI for each of the eNB1 and eNB2 (under assumption that N=6 and M=3).

Therefore, if subbands to be reported to the two eNBs are identically configured as shown in FIG. 17, the UE need report information for subband selection only once, thereby reducing feedback overhead. In addition, the UE may use a bit for reporting second subband selection information for another purpose (e.g. for report of a wideband PMI/CQI).

In the present invention, an additional operation of a UE necessary for applying a common subband according to a subband CSI feedback scheme of current LTE will be described hereinbelow. The proposal of the present invention is not restricted to LTE and the additional operation of the UE may be identically applied to other communication technologies using the common subband.

Figure 18:
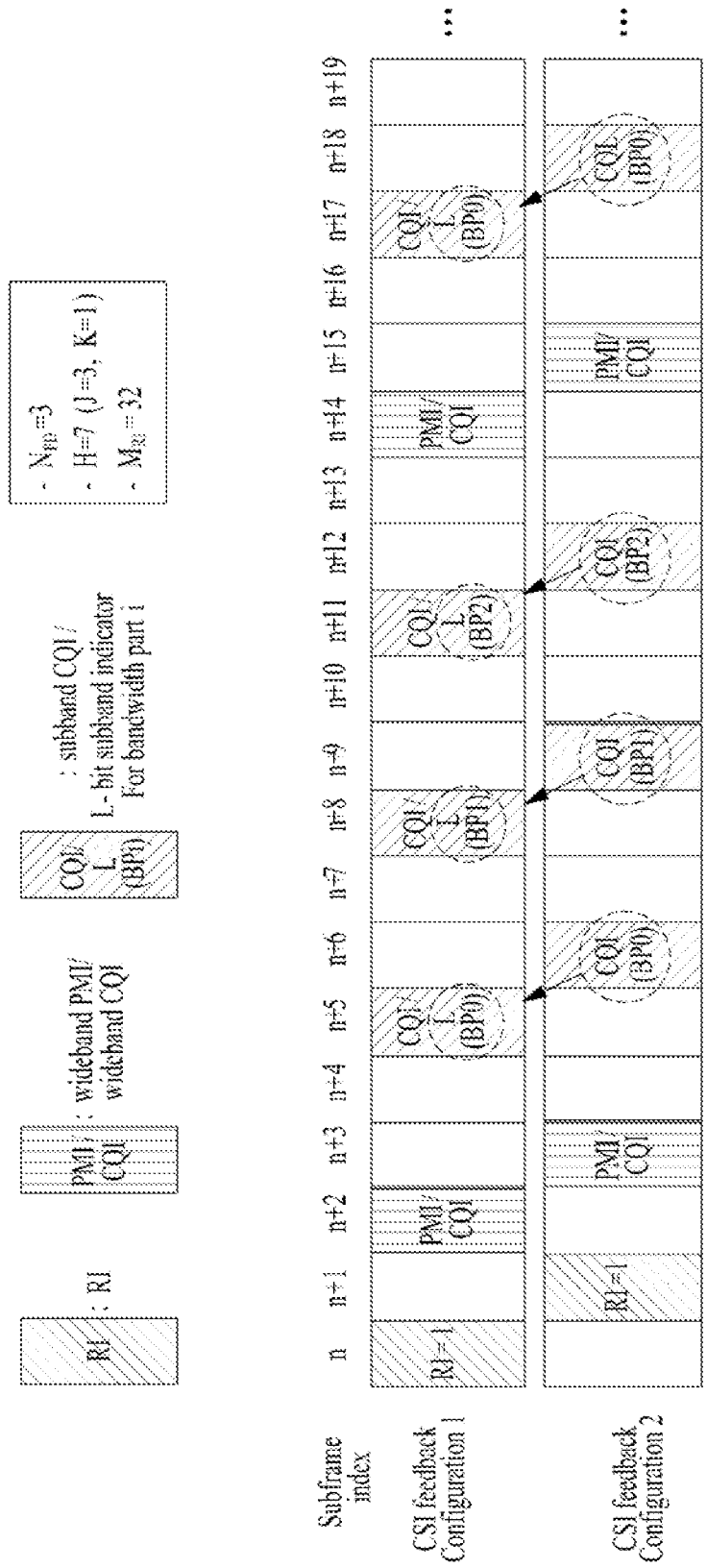
FIG. 18 illustrates a multi-CSI feedback operation of a UE using a common subframe for cooperation between two eNBs.

FIG. 18 illustrates a multi-CSI feedback operation of a UE using a common subframe for cooperation between two eNBs.

In FIG. 18, it is assumed that a CSI feedback configuration 1 for transmitting CSI of an eNB1 and a CSI feedback configuration 2 for transmitting CSI of eNB2 are configured for a UE. Although a situation in which two cells cooperatively perform communication will be described below for convenience of description, it is apparent that the present invention can be applied to the case in which a plurality of TPs cooperatively performs communication.

Among multiple CSI feedback configurations, a CSI feedback configuration for a common subband may be configured by CSI feedback using a higher layer signal such as an RRC signal, designated by an eNB to a UE, by CSI feedback generated from the lowest Non-Zero Power (NZP) CSI-RS index, or by CSI feedback generated from the lowest NZP CSI-RS index and the lowest IMR index. In addition, the other CSI feedback configurations are determined based on common subband information.

If the period and offset of each CSI feedback configuration are appropriately adjusted such that the BP of the CSI feedback configuration 1 is aligned with the BP of the CSI feedback configuration 2, a common subband may be applied as in a conventional operation performed by the UE.

Referring to FIG. 18, after a subframe in which a subband CQI of an i-th BP in the CSI feedback configuration 1 is fed back, if the subband CQI of the i-th BP having the same index in CSI feedback configuration 2 is fed back, the UE generates the subband CQI by applying the latest reported common subband to the CSI feedback configuration 2 without considering order of BPs.

That is, since subframes in which BPs have already been transmitted are aligned in the two CSI feedback configurations of periodic PUCCH mode 2-1, the UE reports the subband CQI by applying the latest feedback subband index in the CSI feedback configuration 1 to the CSI feedback configuration 2.

Accordingly, the eNB may properly adjust the offsets and periods of multiple CSI feedback configurations so that BPs in the CSI feedback configurations may be aligned.

In addition, according to the present invention, an L-bit subband indicator in a specific CSI feedback configuration may be configured to be identically transmitted or to be omitted, with respect to an L-bit subband indicator used for signaling a proper subband index (best subband index) in a BP For example, in FIG. 18, the CSI feedback configuration 1 is configured to report subband CQIs and subband indexes in subframes n+5, n+8, and n+11 for BPs 0, 1, and 2 and the CSI feedback configuration 2 is configured to report subband CQIs for BPs 0, 1, and 2 in subframes n+6, n+9, and n+12. In this case, subbands in the CSI feedback configuration 2 may be configured to be the same as subbands (i.e. subframes n+5, n+8, and n+11) reported according to the aligned CSI feedback configuration 1. That is, if a process according to the CSI feedback configuration 1 is configured as a reference process, a process according to the CSI feedback configuration 2 may be configured to feed back an L-bit subband indicator used in the reference process.

Although it has been assumed that L-bit information for a CSI feedback configuration in which a common subband is not transmitted is not fed back, the same L-bit information as that of a common subband of a corresponding BP may be fed back even in the CSI feedback configuration in which the common subband is not transmitted.

Figure 19:
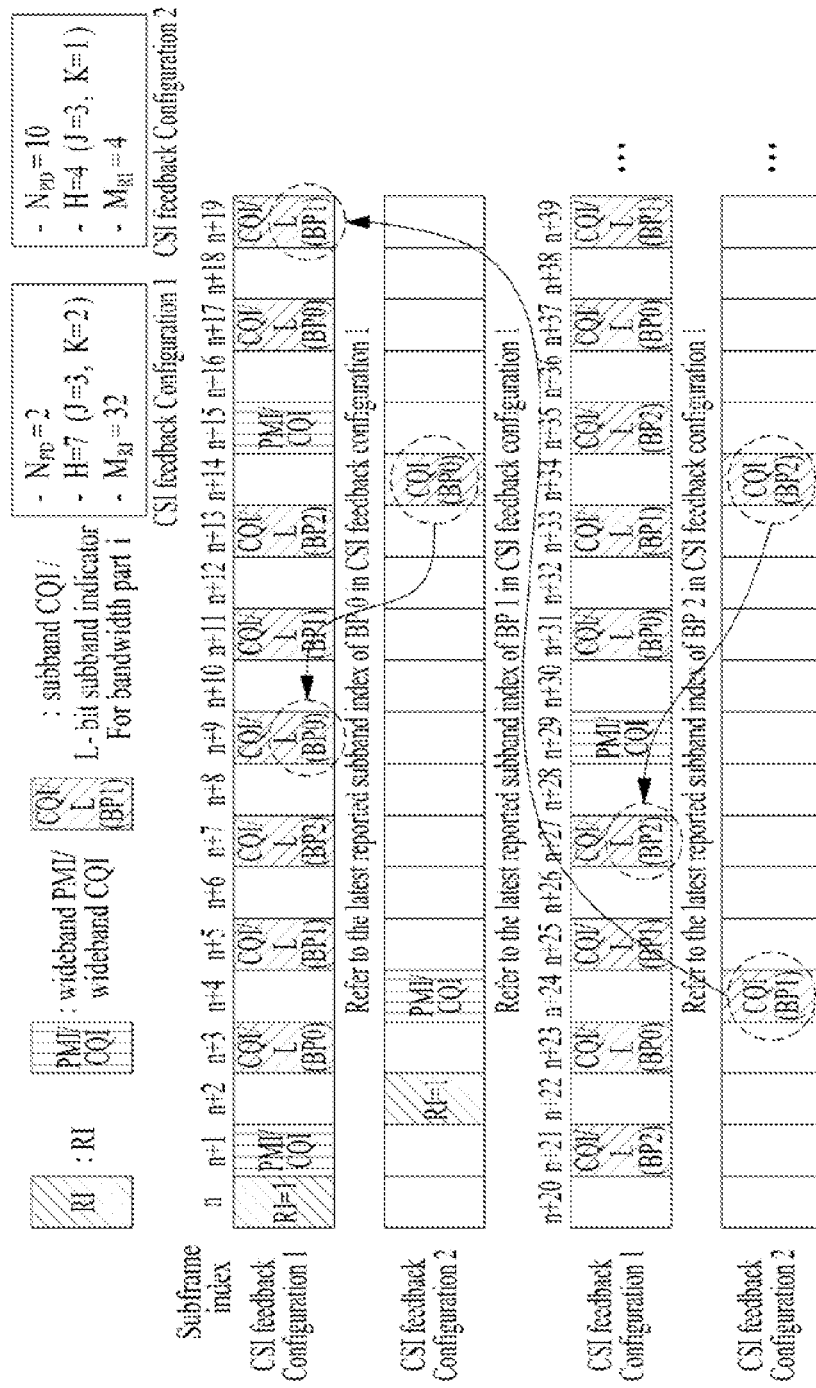
FIG. 19 illustrates the case in which orders of BPs are not aligned due to different periods of CSI feedback configurations.

FIG. 19 illustrates the case in which orders of BPs are not aligned due to different periods of CSI feedback configurations.

Referring to FIG. 19, if a subband of a CSI feedback configuration 2 is configured as a common subband most recently transmitted through a CSI feedback configuration 1, since reference for the subband of the CSI configuration 2 is made to subband indexes for other BPs, severe performance degradation may occur.

According to the present invention, the UE may apply a common subband in consideration of a BP index upon generating multiple CSI for the command subband. That is, a CQI for the latest reported common subband in the same BP may be configured.

For example, if a CQI of an i-th BP is reported in the CSI feedback configuration 2, the UE may use the most recently transmitted information out of L-bit control information of the i-th BP reported through the CSI feedback configuration 1. Namely, the UE may refer to or use subband indexes which are fed back in subframes n+9, n+19, and n+27 of the CSI feedback configuration 1 in order to calculate subband CQIs of BPs 0, 1, and 2 which are fed back in subframes n+14, n+24, and n+34 of the CSI feedback configuration 2.

Accordingly, the UE may store an index of the latest reported common subband per BP for reference.

That is, in FIG. 19, the UE calculates the CQIs of the CSI feedback configuration 2 with reference to a common subband prior to prescribed subframes and, thus, the UE should store a common subband index in the memory for a long time in order to refer to the common subband prior to the prescribed subframes. In the present invention, the common subband index is defined as a subframe index for a common subband.

However, if the common subband index or information related thereto is stored for a long time, the probability of losing the common subband index is increased while other information is stored in the memory and the common subband may not be effective any more due to channel aging.

Therefore, when the common subband index is stored for a long time, it is preferable that the UE sets a CQI of a corresponding BP as the lowest value. This is because, if the UE feeds back a CQI for an arbitrary subband in a state having no common subband index information, since the eNB recognizes the fed back CQI as a CQI for a common subband, the UE and eNB assume different subbands and thus incorrect scheduling between the UE and eNB may be performed.

That is, the UE may be configured to feed back the lowest CQI with respect to a common subband index stored for a long time so that the eNB may determine that quality of a channel transmitted with the lowest CQI is not good, thereby lowering possibility of scheduling to a specific channel.

Alternatively, the UE may select a subband having the lowest channel strength based on a Signal-to-Interference-plus-Noise Ratio (SINR) to feed back a CQI and subband index of the selected subband.

Accordingly, in order to prevent incorrect scheduling between the UE and the eNB, it is desirable that the eNB guarantee common subband reference always within a predetermined number of subframes by appropriately setting the offset and period of a CSI feedback configuration.

In the present invention, the eNB and the UE may determine whether to generate CSI by applying a common subband using a SubFrame Threshold (SFT) as an embodiment for feeding back multiple CSI using the common subband.

That is, when a common subband index is within the SFT, a CQI may be calculated with reference to a subband corresponding to the common subband index and feedback of an L-bit subband indicator may be omitted. If the common subband index is not within the SFT, a new subband may be selected by reflecting a current channel state in a BP and the L-bit subband indicator may be fed back together with the CQI.

For example, in a state that a CSI feedback configuration 1 (hereinafter, CFC 1) and a CSI feedback configuration 2 (hereinafter, CFC 2) are set, if a common subband report is configured through higher layer signaling such that the CFC 1 may report a subband index and the CFC 2 may not report the subband index, the UE may assume that a reporting subframe of the CFC 1 and a reporting subframe of the CFC 2 for the same BP are within a prescribed number of subframes or that the reporting subframe of the CFC 2 is within a prescribed number of subframes after the reporting subframe of the CFC 1.

Furthermore, in the present invention, an SFT may be configured according to time at which a subframe characteristic is changed due to channel aging, based on UE mobility and channel change rate. If the SFT is determined by the eNB, the SFT may be semi-statically indicated to the UE through higher layer signaling such as RRC. Alternatively, the UE may determine the SFT and signal the SFT to the eNB. If the UE determines the SFT, it is preferable to determine the SFT by additionally considering buffer size.

Figure 20:
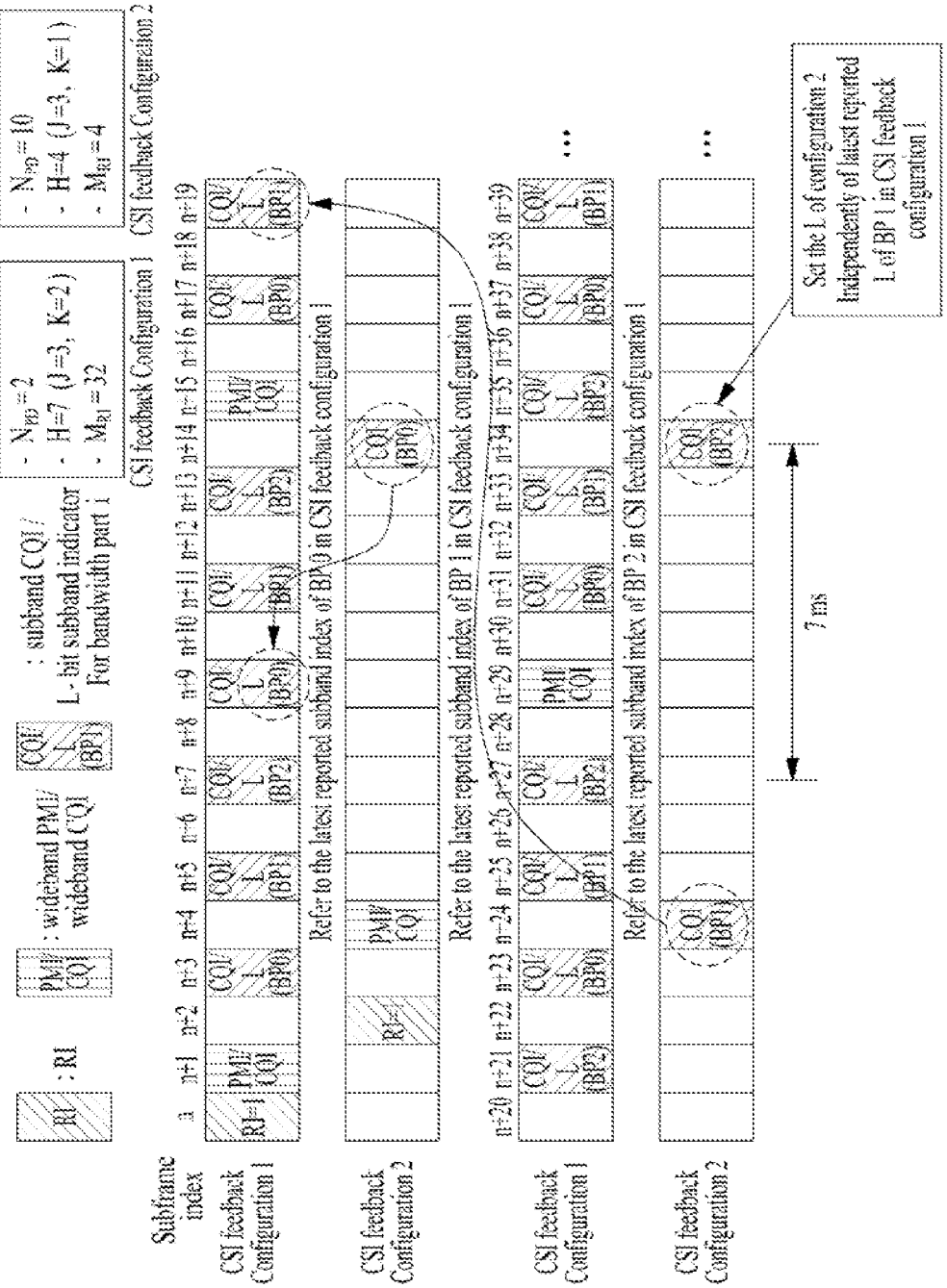
FIG. 20 illustrates an embodiment of feeding back multiple CSI using a common subband by applying an SFT according to the present invention.

FIG. 20 illustrates another embodiment of feeding back multiple CSI using a common subband by applying an SFT according to the present invention.

For example, if an SFT is set to 5, subband CQIs fed back in subframes n+14 and n+24 of a CFC 2 are calculated using corresponding common subbands because subframe indexes of the common subbands are within 5 subframes starting from a feedback time point. An L-bit subband indicator in the CFC 2 may be omitted. However, for a subband CQI which is fed back in a subframe n+34 of the CFC 2, a new subband is selected by reflecting a current channel state and a corresponding L-bit subband indicator is fed back together with the CQI, because a corresponding common subband index is not within 5 subframes.

Figure 21:
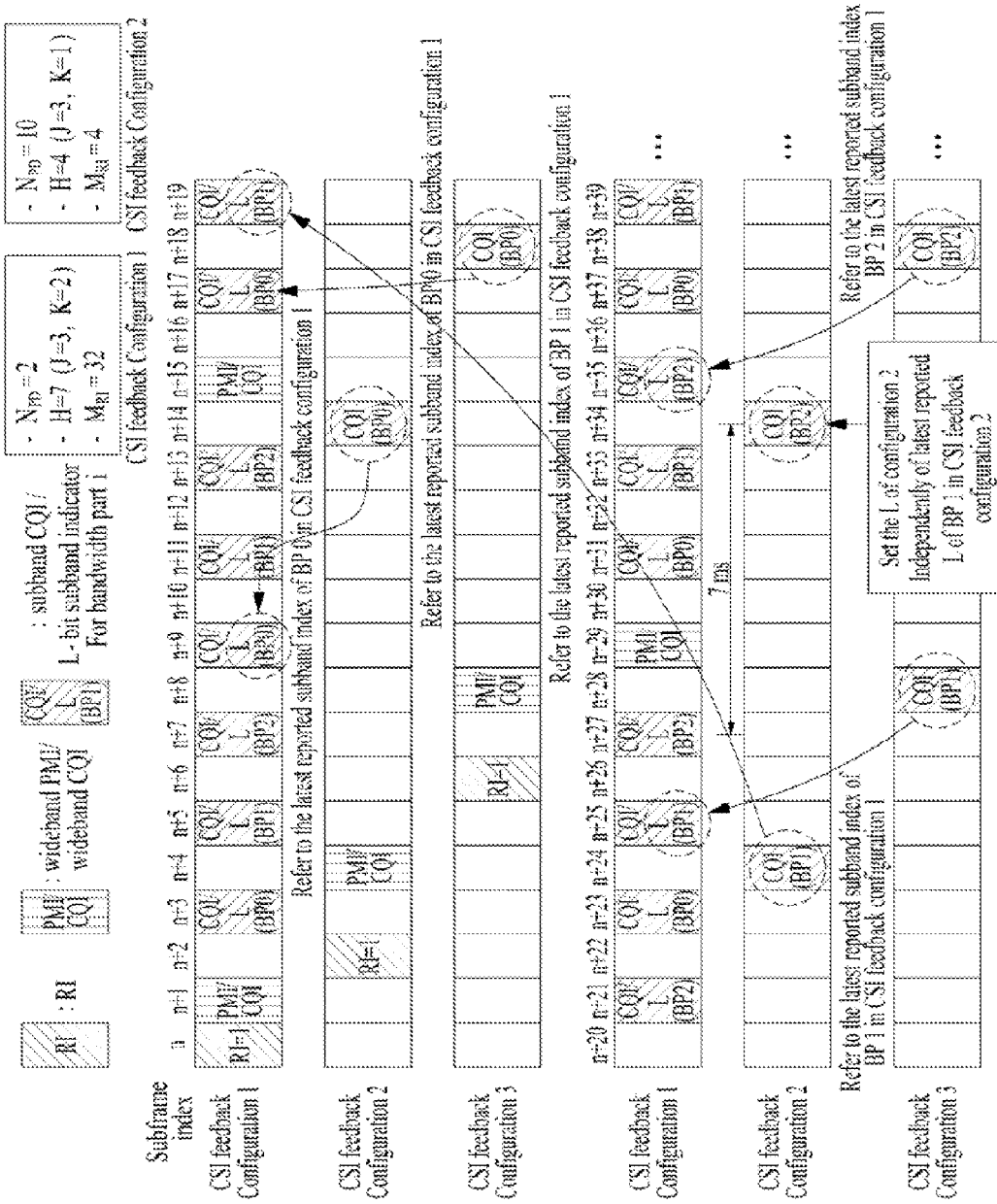
FIG. 21 illustrates an embodiment of feeding back a common subband through a specific CSI feedback configuration when there are three CSI feedback configurations for CoMP according to the present invention.

FIG. 21 illustrates an embodiment of feeding back a common subband through a CFC 1 when there are three CSI feedback configurations for CoMP according to the present invention. It is assumed that a CFC 1, a CFC 2, and a common subband of the two CFCs are the same as those of FIG. 20. In a CFC 3, since the common subband is within 5 subframes set as an SFT, an additional L-bit subband indicator is not fed back.

That is, if one reference CFC for feeding back a common subband is present and a plurality of CFCs for omitting feedback of an L-bit subband indicator by applying the common subband is configured for one UE, an independent SFT per CFC may be applied.

Referring to FIG. 21, if an index time point of a common subband in a BP2 of the CFC 2 exceeds an SIT and an index time point of a common subband in a BP2 of the CFC 3 is within the SFT, the UE performs feedback such that the common subband is not applied in the BP2 of the CFC 2 but the common subband is applied in the BP2 of the CFC 3

Unlink FIG. 21, SFTs are dependently applied in a plurality of CFCs. That is, if one reference CFC for feeding back a common subband is present and a plurality of CFCs for omitting an L-bit subband indicator by applying the common subband are configured for one UE, SFTs may be dependently applied in the plurality of CFCs.

Figure 22:
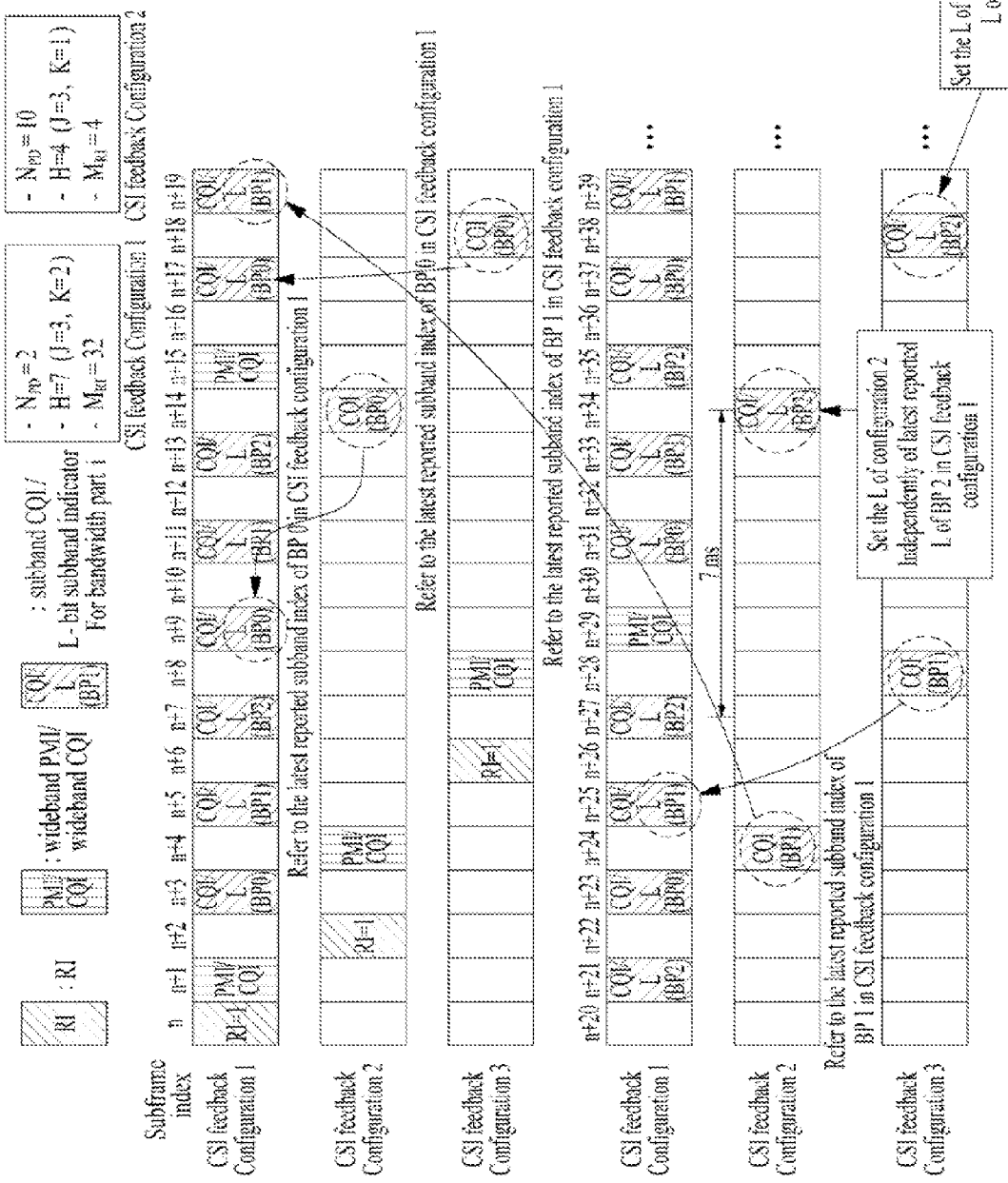
FIG. 22 illustrates an embodiment in which SFTs are dependently applied in a plurality of CFCs according to the present invention.

FIG. 22 illustrates an embodiment in which SFTs are dependently applied in a plurality of CFCs according to the present invention.

Referring to FIG. 22, since a common subband index time point is within an SFT in a BP2 of a CFC 3 but exceeds the SFT in a BP2 of a CFC 2, the UE may not apply a common subband both in the BP2 of the CFC 2 and in the BP2 of the CFC 3.

For example, if the SFT is set to 5 subframes, subband CQIs which are fed back in subframes n+14 and n+24 of the CFC 2 and subframes n+18 and n+28 of the CFC 3 are generated using a common subband and feedback of an L-bit subband indicator in the CFCs 2 and 3 may be omitted, because corresponding common subband indexes are within 5 subframes. However, for a subband CQI which is fed back in a subframe n+34 of the CFC 2, a new subband is selected by reflecting a channel state of the corresponding time point (i.e. subframe n+34) and a corresponding L-bit subband indicator is fed back together with a new CQI because a common subband index is not within 5 subframes. In this case, even though a common subband index corresponding to a subframe n+38 of the CFC 3 is present in a subframe n+35 of the CFC 1, an L-bit subband indicator is feedback together with the new CQI (for a reconfigured subband in the subframe n+34).

That is, if a common subband index time point corresponding to a specific BP of at least one CFC among a plurality of CFCs (i.e. the CFC 2 and CFC 3) except for a reference CFC (the CFC 1) exceeds an SFT, the plural CFCs (i.e. the CFC 2 and CFC 3) other than the reference CFC may select a new subband obtained by reflecting a channel state and feed back an L-bit subband indicator related to the selected subband together with CQI or omit the L-bit subband indicator.

Additionally, for system flexibility, an SFT may be set with reference to each CFC. At this time, whether to apply a common subband to each CFC may be independently determined.

If three or more CFCs are present, a common subband may be applied to a part of the CFCs and a subband using a conventional scheme may be applied to the other CFCs. For a CFC applying a subband using the conventional scheme, an unrealistically large value may be set as the SFT to perform the conventional subband scheme (i.e. a stored subband index may always be used).

The eNB may signal a 1-bit flag corresponding to each CFC to the UE using a bitmap scheme so that a common subband is applied to a CFC having a flag of 1 and the conventional subband scheme may be applied to a CFC having a flag of 0.

In the above-described embodiments, a common subband index is fed back in a specific CFC and the fed back common subband index is used for other CFCs. Additionally, the embodiments may be applied to the case in which a CFC which feeds back a common subband index based on an SFT is changed or reconfigured to feed back a CQI.

For example, assuming that a CFC 1 is initially designated to feed back a common subband index in a situation in which CFCs 1, 2, and 3 are configured according to the present invention, a common subband may be applied in the case in which the common subband index is effective based on an SFT in the CFC 2 or 3.

However, if the common subband index is not effective, a new common subband may be reconfigured in the CFCs 2 and 3 and information about the new common subband may be fed back.

Figure 23:
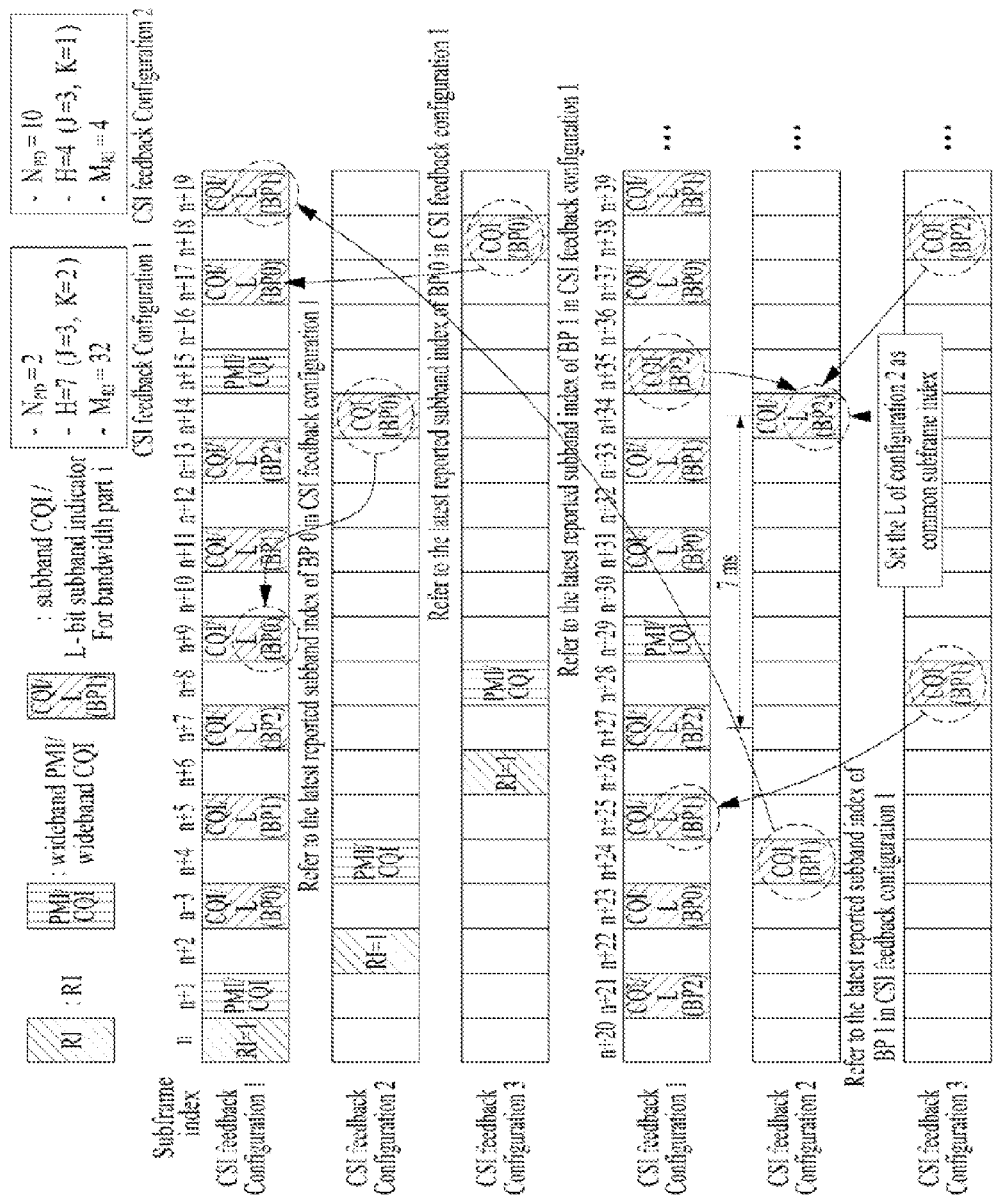
FIG. 23 illustrates an embodiment in which a CFC for feeding back a common subband index based on an SFT is changed according to the present invention.

FIG. 23 illustrates an embodiment in which a CFC for feeding back a common subband index based on an SFT is changed according to the present invention.

For example, in a situation where CSI feedback configurations (CFCs) 1, 2, and 3 are configured according to the present invention, when a situation where CSI feedback configuration 1 is initially designated to feed back the common subband index is assumed, and in case the common subband index is valid in CSI feedback configuration 2 or CSI feedback configuration 3 based upon subframe threshold (SFT), the common subband may be applied.

However, if the common subband is not valid (or invalid), CSI feedback configuration 2 and CSI feedback configuration 3 may reconfigure a new common subband and may be configured to feed back the respective information.

FIG. 23 illustrates an exemplary embodiment wherein a CSI feedback configuration that feeds-back the common subband index with reference to the subframe threshold (SFT) varies according to the present invention.

More specifically, when it is assumed that the CSI feedback configuration is identical to that of FIG. 21, a valid common subband index within a subframe threshold (e.g., subframes) does not exist in SF n+34 of CSI feedback configuration 2. Therefore, the UE reconfigures a new common subband by reflecting a new channel state (i.e., SF n+34) and performs CQI feedback by using the newly configured common subband.

When the CSI feedback configuration is reconfigured, the CQI may be fed back by using the newly reconfigured reference CSI feedback configuration (i.e., CSI feedback configuration 2). Therefore, CSI feedback configuration 1 and CSI feedback configuration 3 applies a subframe threshold (SFT) based upon the newly reconfigured common subband of CSI feedback configuration 2, and, in case the subframe threshold is satisfied, the CQI is fed back in accordance with the common subband. Additionally, in case the subframe threshold is not satisfied once again, the CSI feedback configuration that does not satisfy the subframe threshold (SFT) reconfigures a common subband reflecting the channel state once again, and the remaining CSI feedback configurations may refer to this value.

Additionally, FIG. 23 illustrates a case when the CSI feedback configuration feeding back the common subband for each BP varies, and, after n+34, the common subband of BP 2 may be fed back from CSI feedback configuration 2, and the common subband of BPs 0 and 1 may be fed back through CSI feedback configuration 1. Evidently, in case the CSI feedback configuration (CFC) feeding back the common subband in an arbitrary BP is reconfigured, configurations may be made so that the common subband can be transmitted through the reconfigured CSI feedback configuration in the remaining BPs.

In the case shown in FIG. 23, in case the common subband is applied, as described above, the L-bit subband indicator may be omitted. However, the UE does not omit the value that is associated with the L-bit subband indicator and may allow the same L value corresponding to the common subband index to be fed back. Additionally, in this case, based upon the subframe threshold (SFT), when the UE determines that a valid common subband index exists, the UE feeds back an L value that is equal to the common subframe index, and, otherwise, the UE may feed back a subband index corresponding to the new subband and CQI by reflecting the current channel state. Furthermore, in case the same L value is being fed back, the subband index that is fed back may only be applied to the corresponding CSI feedback configuration, or the fed back subband index may correspond to a new common subband.

The multiple CSI feedback method using the common subband of the present invention may be limited to a case when multiple CSI feedbacks, which are generated based upon the same component carrier (CC), is to be performed. More specifically, as in a Carrier Aggregation (CA) situation, in case each of the multiple CSIs is configured based upon a different CC, the multiple CSI feedback method using the common subband according to the present invention may be limited to be applied only to CSIs targeting the same CC. Similarly, as in a situation where CA and CoMP are co-located, even in case some of the CSI, among the multiple CSIs, are configured based upon the same CC, and the remaining CSIs are configured based upon different CCs, the present invention may be applied only to the CSI targeting the CC.

The multiple CSI feedbacks using the common subband according to the present invention may also be extended and applied to a case when a common rank indicator (common RI) is being transmitted.

First of all, a case when a subframe threshold (SFT) is being used and when a CSI feedback configuration transmitting the common RI is fixed will be described. Among the multiple CSI feedback configurations, a CSI feedback configuration transmitting the common RI may be configured as a CSI feedback, which is designated by the base station to the UE by using a higher signal, such as RRC, or may be configured as a CSI feedback that is generated from a lowest NZP CSI-RS index, or may be configured as a CSI feedback that is generated from a lowest NZP CSI-RS index and a lowest IMR index.

Figure 24:
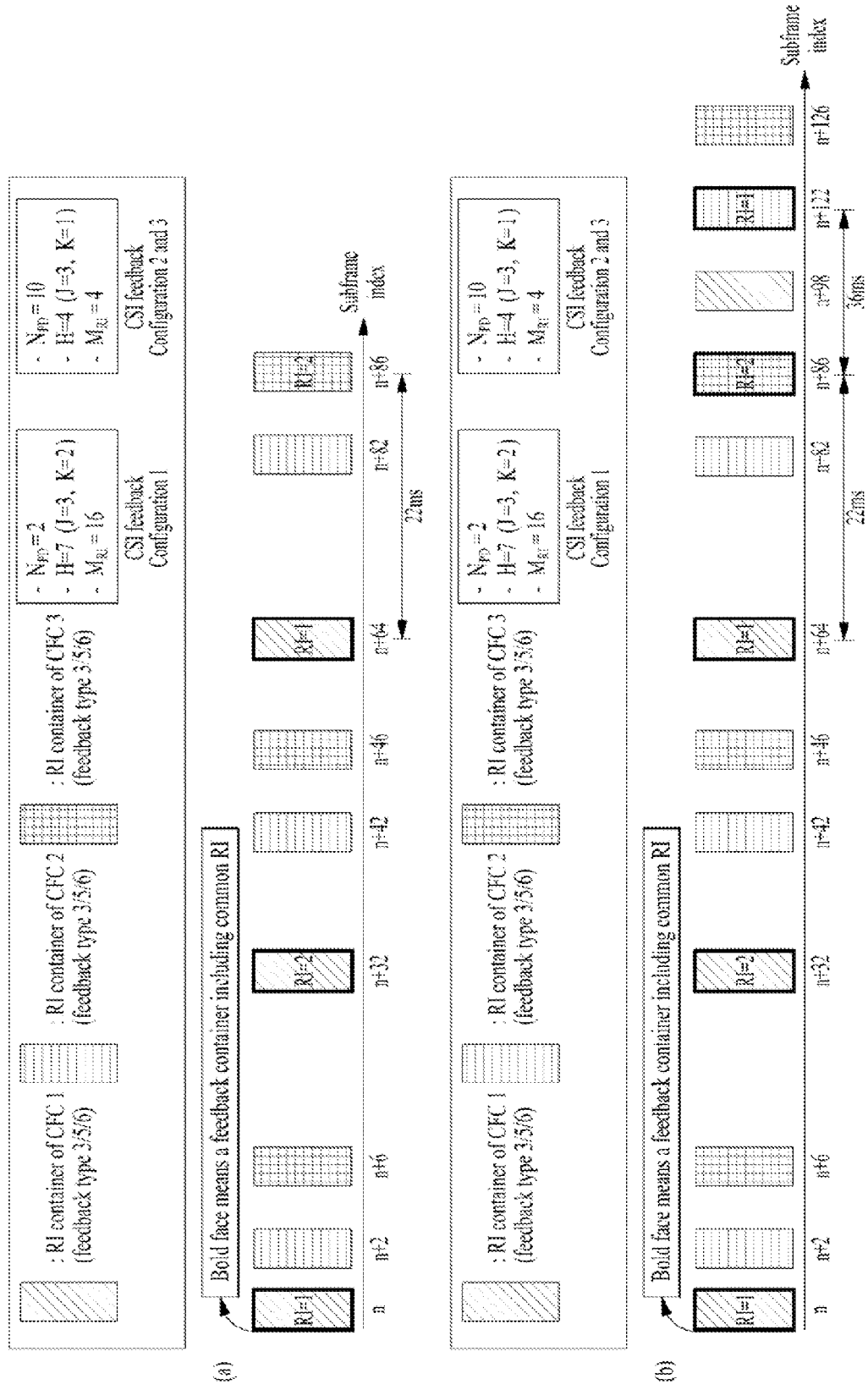
FIG. 24 illustrates use of a common RI for multiple CSI feedback according to the present invention.

In FIG. 24, it is assumed that 3 CSI feedback configurations exist and that a common rank indicator (common RI) is transmitted through CSI feedback configuration 1. Although the PMI/CQI excluding the RI is not shown, it is assumed that the PMI/CQI is fed back in accordance with the cycle period and offset.

The UE calculates the common RI at a cycle period of 32 subframes through CSI feedback configuration 1, and an RI container exists in CSI feedback configurations (CFCs) 2 and 3 at a cycle period of 40 subframes. The RI container may correspond to feedback types 3, 5, and 6, which are defined in LTE, and the RI container is transmitted along with PTI, wideband PMI, and so on. (i.e., in FIG. 24, although only the RI is indicated for the convenience in the description, depending upon the report type, it is assumed that the PTI, wideband PMI are transmitted by being carried in the container.)

In FIG. 24(*a*), when, the subframe threshold is set to 20 subframes, the RI feedback is omitted from SF n+2 and SF n+6, and subsequent PMI/CQI, and so on, which are being fed back through CSI feedback configuration 2 and CSI feedback configuration 3, are all generated based upon the common RI, which is transmitted to SF n, until the next RI container is configured (i.e., until SF n+42, in case of CSI feedback configuration 2, and until SF n+46, in case of CSI feedback configuration 3).

Similarly, the RI feedback of SF n+42 and SF n+46 existing within 20 subframes from SF n+32 is omitted, and subsequent PMI/CQI, and so on, which are being fed back through CSI feedback configuration 2 and CSI feedback configuration 3, are all generated based upon the common RI, which is transmitted to SF n+32, until the next RI container is configured (i.e., until SF n+82, in case of CSI feedback configuration 2, and until SF n+86, in case of CSI feedback configuration 3).

For the feedback following SF n+64, the RI feedback of SF n+82 existing within subframes is omitted, and subsequent PMI/CQI, and so on, which are being fed back through CSI feedback configuration 2, are all calculated based upon the common RI, which is transmitted to SF n+64, until the next RI container is configured (i.e., until SF n+122). However, in SF n+86 of CSI feedback configuration 3, since the common RI does not exist with the subframe threshold of 20 subframes, it is determined that a valid common RI does not exist, and a new RI is transmitted by reflecting the channel state. Additionally, after SF n+86, subsequent PMI/CQI, and so on, are all calculated based upon the RI value, which is transmitted to SF n+86, until the next RI container is configured (i.e., until SF n+126).

Furthermore, in the subframe threshold of the present invention, a value for the common RI and a value for the common subband may be independently configured, and each value may be signaled via higher layer signaling (e.g., RRC, and so on). Since the RI value corresponds to a value, which is mainly configured based upon a long term channel statistic, it will be efficient to configure the subframe threshold for the common RI to be greater (or larger) than the subframe threshold for the common subband.

In FIG. 24(a), in a situation where a valid common RI does not exist in CSI feedback configuration 3 (i.e., SF 86) and where a valid common RI exists in CSI feedback configuration 2 (i.e., SF 82), an exemplary embodiment of independently applying a common RI in accordance with the CSI feedback configuration, by not applying the common RI in CSI feedback configuration 3 and by applying the common RI in CSI feedback configuration 2. Additionally, when multiple CSI feedback configurations referring to the common RI exist, and in case a valid common RI does not exist in even one CSI feedback configuration, the common RI is not applied to any of the CSI feedback configurations until a new common RI is configured, and configurations may be made, so that an individual RI can be calculated by using the conventional method and then fed back.

Additionally, hereinafter, an exemplary embodiment, wherein the subframe threshold (SFT) is used, and wherein the CSI feedback configuration (CFC) transmitting the common RI is being varied, will be described.

According to the present invention, in a situation where CSI feedback configurations 1, 2, and 3 are configured, a situation where CSI feedback configuration 1 is initially designated to feed back a common RI is assumed. In this case, in case the common RI is valid in CSI feedback configuration 2 or CSI feedback configuration 3 based upon the subframe threshold, the common RI may be applied, as shown in FIG. 24(a), however, in case the common RI is not valid, the corresponding CSI feedback configuration may configure and feed back a new RI.

An exemplary embodiment, wherein a CSI feedback configuration feeding back a common RI varies based upon a subframe threshold will be described with reference to FIG. 24(b).

In FIG. 24(b), although the CSI feedback configuration is identical as FIG. 24(a), in this case, since a valid common rank indicator (common RI) does not exist within a subframe threshold (e.g., 20 subframes) from SF n+86 of CSI feedback configuration 3, a new common RI is configured by reflecting the channel state, and the newly configured value is fed back. After SF n+86, CSI feedback configuration 1 and CSI feedback configuration 2 may apply a subframe threshold (SFT) based upon the newly configured common RI of CSI feedback configuration 3, and, in case the subframe threshold (SFT) of 20 subframes is satisfied, the PMI/CQI may be fed back in accordance with the common RI. In case the subframe threshold is not satisfied once again, a new common RI is configured once again from the corresponding CSI feedback configuration, and the remaining CSI feedback configurations may refer to this value.

More specifically, after SF n+86, CSI feedback configuration 1 calculates the PMI/CQI by referring to the common RI of n+86 until a next common RI is configured. And, in SF n+122, since the subframe threshold has failed to satisfy the subframe threshold of 20 subframes, a new common RI is fed back, and the subsequent CSI feedback configuration 1 and CSI feedback configuration 3 may feed back the PMI/CQI based upon the newly configured value (i.e., value configured as SF n+122) until a next common RI is configured.

The common RI transmission method may be limited to when transmitting multiple CSI feedbacks, which are generated based upon the same component carrier (CC). More specifically, as in a Carrier Aggregation (CA) situation, in case each of the multiple CSIs is configured based upon a different CC, the common RI transmission method according to the present invention may be limited to be applied only to CSIs targeting the same CC. Similarly, in a situation where CA and CoMP are co-located, even in case some of the CSI, among the multiple CSIs, are configured based upon the same CC, and the remaining CSI is configured based upon different CCs, the present invention may be applied only to the CSI targeting the CC.

Additionally, in case the common RI is applied as described above in the present invention, the RI feedback may be omitted from the remaining CSI feedback configurations excluding the CSI feedback configurations feeding back the common RI, or the remaining CSI feedback configurations may be configured to feed back the same RI as the common RI. In this case also, based upon the subframe threshold, when the UE determines that a valid common RI exists, the UE feeds back a RI value that is equal to the common RI, and, otherwise, the UE may feedback a new RI by reflecting the current channel state. Also, in case of feeding back the RI as described above, the corresponding RI may only be applied to the respective CSI feedback configuration, or the corresponding RI may correspond to a new common RI.

Additionally, in case three or more CSI feedback configurations exist, a common RI may be applied to some of the CSI feedback configurations, and a RI may be applied to the remaining CSI feedback configurations as in the conventional method. In order to do so, as performed in the conventional method of the latter case, for the CSI feedback configuration adopting RI, the subframe threshold (SFT) value may be set to an impractically (or unrealistically) large value, so that configurations can be made to operate in accordance with the conventional RI method.

Alternatively, the base station signals a 1-bit flag corresponding to each CSI feedback configuration to the UE by using a bitmap method, and, then, configurations may be made so that the CSI feedback configuration having a flag set to 1 can adopt a common RI, and so that the CSI feedback configuration having a flag set to 0 can be operated by using the conventional RI method.

Although the above-described exemplary embodiments of the present invention has been described in light of the common RI and the selected common subband index, the present invention may also be extended and applied to a case when a common PMI is being applied between different CSI processes, or to a case when a common PMI is being applied between subframe set 0 and subframe set 1 of one CSI process.

An exemplary embodiment of an extended application of the exemplary embodiment, which has been described above with reference to FIG. 24, being applied to a multiple CSI feedbacks using a common PMI will hereinafter be described. When CSI feedback is performed in a CoMP system, a same PMI is assumed with respect to two or more CSI processes, and CSI may be generated accordingly. In this case, the same PMI may be referred to as the common PMI.

For example, in case CSI feedback configuration 1 and CSI feedback configuration 2 are configured, the UE may configure a PMI being calculated based upon CSI process 1 as the common PMI, and, then, the UE may generate RI, CQI, and PMI information of CSI process 2 by using the common PMI as the PMI of CSI process 2. Additionally, the UE may configure an optimal PMI being calculated based upon all channels corresponding to CSI feedback configuration 1 and CSI feedback configuration 2 as the common PMI, and, then, the UE may generate RI, CQI, and PMI information of each process by using the common PMI and PMI information of CSI process 1 and CSI process 2. The characteristics of the common PMI may also be applied when a common subband or common RI is applied to the CSI process.

Herein, multiple CSI processes may feed back the same common PMI. Additionally, the common PMI may be fed back through one CSI process, and the remaining CSI processes may omit the PMI feedback. Such characteristics may also be applied when a common subband or common RI is applied to the CSI process.

In case of using the common PMI, the base station or the user equipment may decide whether or not to apply the common PMI by using the subframe threshold. In a periodical feedback method, each CSI process is independently configured with respect to the feedback cycle period and offset of the RI, PMI, and CQI. The user equipment may decide whether or not to apply the common PMI by using the following method with respect to a specific CSI process.

The user equipment compares a subframe to which the most recent common PMI has been transmitted with a subframe feeding back the PMI. In case the difference between the two subframes is located within the subframe threshold, the CQI of the corresponding CSI process is calculated by using the common PMI. If the difference deviates from the subframe threshold, the user equipment selects and feeds back a new PMI by reflecting the current channel status and then calculates the CQI based upon the new PMI.

In case CSI feedback configuration 1 and CSI feedback configuration 2 are configured to use the common PMI, and in case only CSI feedback configuration 1 of the two CSI feedback configurations is configured to report the common PMI (e.g., via higher layer signaling, such as RRC, and so on), the user equipment may determine that a PMI reporting subframe of CSI feedback configuration 1 and a PMI reporting subframe of CSI feedback configuration 2 exist within the subframe threshold. More specifically, it may be determined that, after the subframe that has reported the PMI of CSI feedback configuration 1, a subframe reporting the PMI of CSI feedback configuration 2 exists within the subframe threshold.

In case CSI feedback configuration 1 and CSI feedback configuration 2 are configured to use the common RI, and in case only CSI feedback configuration 1 of the two CSI feedback configurations is configured to report the common RI (e.g., via higher layer signaling, such as RRC, and so on), the user equipment may determine that a RI reporting subframe of CSI feedback configuration 1 and a RI reporting subframe of CSI feedback configuration 2 exist within the subframe threshold. More specifically, it may be determined that, after the subframe that has reported the RI of CSI feedback configuration 1, a subframe reporting the RI of CSI feedback configuration 2 exists within the subframe threshold.

Additionally, in case a reference CSI feedback feeding back the common PMI is configured, and in case multiple CSI feedback configurations using the common PMI of the reference CSI feedback and omitting the PMI transmission are configured to one user equipment, the subframe threshold may be independently applied with respect to each CSI feedback configuration. Moreover, in case a reference CSI feedback feeding back the common PMI is configured, and in case multiple CSI feedback configurations using the common PMI of the reference CSI feedback and omitting the PMI transmission are configured to one user equipment, the subframe threshold may be equally applied to multiple CSI feedback configurations.

Additionally, for system flexibility, a subframe threshold may be configured for each CSI feedback configuration, and whether or not to apply the common PMI to each CSI feedback configuration may be independently decided.

Additionally, in case three or more CSI feedback configurations exist, a common PMI may be applied to some of the CSI feedback configurations, and the common PMI may not be applied to the remaining CSI feedback configurations. In the CSI feedback configuration that does not apply the common PMI, the subframe threshold (SFT) value may be set to an impractically (or unrealistically) large value, and, accordingly, the common PMI feedback method may not be used.

Alternatively, the base station transmits a 1-bit flag corresponding to each CSI feedback configuration to the UE by using a bitmap method, and, then, configurations may be made so that the CSI feedback configuration having a flag set to 1 can be set to use the common PMI, and so that the CSI feedback configuration having a flag set to 0 can beset not to use the common PMI.

Additionally, hereinafter, an exemplary embodiment, wherein the subframe threshold (SFT) is used, and wherein the CSI feedback configuration (CFC) transmitting the common PMI is being varied, will be described.

In case CSI feedback configurations 1, 2, and 3 are configured, and, among the three CSI feedback configurations, in case CSI feedback configuration 1 is configured to feed back the common PMI, CSI feedback configuration 2 or CSI feedback configuration 3 applies the common PMI based upon the subframe threshold. In case the common PMI is not used due to a deviation from the subframe threshold, a new common PMI may be configured in the corresponding CSI feedback configuration, and the newly configured common PMI is fed back. The remaining CSI feedback configurations calculate the CSI by applying the common PMI within the subframe threshold based upon the new common PMI.

In the above-described exemplary embodiments, when the common PMI is being applied, within the exception for one CSI process, the remaining CSI processes may omit the PMI feedback. Alternatively, instead of omitting the PMI feedback, the user equipment may also feed back the same PMI value through the remaining CSI process. In this case also, in case the common PMI is being applied within the subframe threshold, the user equipment feeds back a PMI value that is equal to that of the common PMI, and, when the common PMI is applied outside of the subframe threshold, the user equipment feeds back a new PMI and CQI by reflecting the current channel state.

The transmission of the common PMI may be limited to multiple CSI feedbacks, being generated based upon the same component carrier (CC). More specifically, as in a Carrier Aggregation (CA) situation, in case each of the multiple CSIs is configured based upon a different CC, the common PMI transmission method according to the present invention may be applied only between CSIs targeting the same CC. Similarly, as in a situation where CA and CoMP are co-located, even in case some of the CSI, among the multiple CSIs, are configured based upon the same CC, and the remaining CSI are configured based upon different CCs, the present invention may be applied only to the CSI targeting the CC.

Among the multiple CSI feedback configurations, a CSI feedback, through which a common PMI, a common subband, or a common RI is transmitted, may be configured by the base station to the UE by using higher signaling, such as RRC, or may be configured as a CSI feedback that is generated from a lowest NZP CSI-RS index, or may be configured as a CSI feedback that is generated from a lowest NZP CSI-RS index and a lowest IMR index.

The subframe threshold may be separately configured for each of the common PMI, the common subband, or the common RI, and each of the common PMI, the common subband, or the common RI may be transmitted via higher signaling, such as RRC, and so on.

Compression Transmission of Multiple Channel State Information (CSI)

In a CA system, in case multiple CSIs are aperiodically fed back, channel encoding is performed on the multiple CSIs with respect to each CSI type. For example, the user equipment performs encoding after performing concatenation of multiple RIs, and the user equipment performs encoding after performing concatenation of multiple PMIs/CQIs, which is performed separately from the multiple RIs. At this point, the concatenation order is decided as an increasing order starting from a lowest CA index.

Since multiple CSIs are also fed back in a CoMP system, when performing aperiodic feedback, the CSI feedback method of the CA system may be applied. More specifically, the user equipment performs encoding after performing concatenation of multiple RIs, and the user equipment performs encoding after performing concatenation of multiple PMIs/CQIs, which is performed separately from the multiple RIs. At this point, the concatenation order may be decided as an increasing order starting from a lowest CA index or may be decided as a decreasing order starting from a highest CA index. For example, in case a lower index is assigned as the CSI process index of a more significant (or important) CSI process, it is preferable to decide the concatenation order as an increasing order of the CSI process index. Hereinafter, the concatenation order will be described by assuming to be set as an increasing order of the CSI process index, the concatenation order will not be limited only to this.

In the CoMP system, in case the above-described common subband, common RI, or common PMI is being applied, multiple CSI processes use the same subband, the same RI, or the same PMI. Hereinafter, for simplicity in the description, at least one of the common subband, the common RI, and the common PMI will be referred to as a common CSI. Additionally, the user equipment may be configured to apply at least one of the following methods via higher layer signaling (e.g., RRC signaling).

According to the CSI feedback method in the CoMP system according to the present invention, among the multiple CSI processes using the common CSI, only one CSI process feeds back the common CSI, and the remaining CSI processes are configured not to feed back overlapping information, thereby allowing feedback overhead to be reduced.

More specifically, in case the user equipment aperiodically feeds back multiple CSIs, and in case a part or whole uses the common CSI in the CoMP system, among CSI processes using the common CSI, the user equipment feeds back only part (or some) of the CSI processes, thereby preventing feedback of overlapping information from occurring. At this point, among the processes using the common CSI, the CSI processes that are to participate in the feedback may be decided by using one of the following methods. At this point, the user equipment performs the following methods based upon the CSI process index.

Firstly, among the multiple CSI processes using the common CSI, the user equipment may feed back the common CSI through a CSI process having the smallest (or lowest) index. More specifically, among the CSI processes using the common CSI, the user equipment may feed back the CSI of the CSI process having the lowest index and the CSI of a CSI process that does not use the common CSI in a concatenated order.

For example, in case 5 CSI processes starting from CSI processes 0 to 4 are configured to the user equipment, and in case CSI processes 1, 3, and 4 use the common CSI, the user equipment performs concatenation in the order of the CSI of CSI process 0, the CSI of CSI process 1, and the CSI of CSI process 2, and the CSIs of the remaining CSI processes are excluded from the concatenation. Additionally, in another example, in case 5 CSI processes starting from CSI processes 0 to 4 are configured to the user equipment, and in case all CSI processes use the common CSI, the user equipment only feeds back the CSI of CSI process 0, and the user equipment does not perform concatenation of the CSIs of CSI processes 1 to 4.

The first method is effective in case the user equipment calculates the common CSI based upon all CSI processes using the common CSI.

Secondly, among the CSI processes using the common CSI, the user equipment may be designated with CSI processes transmitting the common CSI via higher layer signaling (e.g., RRC signaling). The user equipment feeds back the common CSI to the designated CSI processes. More specifically, among the CSI processes using the common CSI, the user equipment feeds back the common CSI of the designated CSI processes and the CSI of CSI processes that do not use the common CSI in a concatenated order.

For example, in case 5 CSI processes starting from CSI processes 0 to 4 are configured to the user equipment, and in case CSI processes 1, 3, and 4 use the common CSI, and in case CSI process 4 is designated to transmit the common CSI, the user equipment performs concatenation in the order of the CSI of CSI process 0, the CSI of CSI process 2, and the CSI of CSI process 4, and the CSIs of the remaining CSI processes are excluded from the concatenation. Additionally, in another example, in case 5CSI processes starting from CSI processes 0 to 4 are configured to the user equipment, and in case all CSI processes use the common CSI, and in case CSI process 1 is designated to transmit the common CSI, the user equipment only feeds back the CSI of CSI process 1, and the CSIs of the remaining CSI processes excluding CSI process 1 are excluded from the concatenation.

The second method is effective in case, among the CSI processes using the common CSI, the user equipment calculates the common CSI based upon only the CSI processes transmitting the common CSI, and in case the user equipment applies the calculated value to the remaining CSI processes.

In the second method, higher layer signaling is used in order to designate the CSI process transmitting the common CSI. A higher layer signaling, which is newly configured for the above-described function, or which is conventionally defined, may be used as the above-described higher layer signaling. The higher layer signaling that is conventionally defined may correspond to a reference process index being defined in the CSI process. When a specific CSI process shares the common CSI with another CSI process, the specific CSI process inherits (or succeeds) a common CSI value of the CSI process having the reference process index. For example, in case CSI process 1 and CSI process 2 are configured in the user equipment, and in case the reference process index is defined as 1 in CSI process 2, the user equipment feeds back the common CSI of CSI process 1 and does not feed back the common CSI of CSI process 2.

Figure 25:
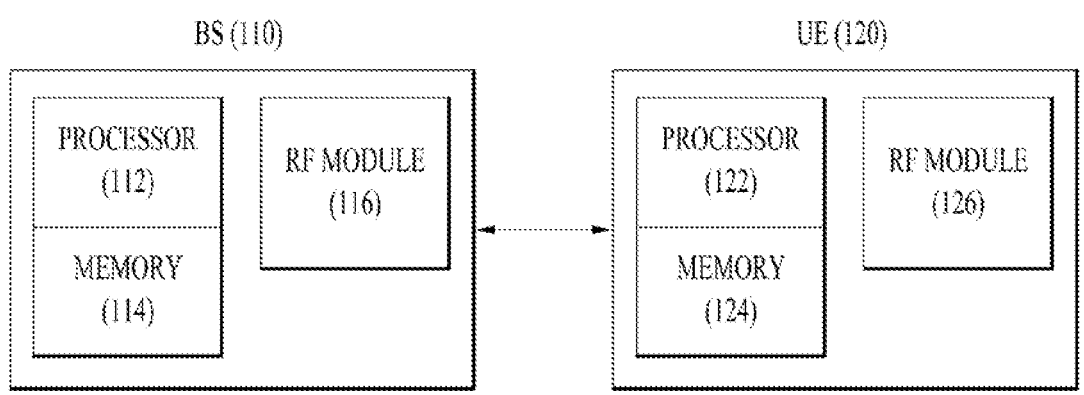
FIG. 25 illustrates a BS and a UE which are applicable to the present invention.

FIG. 25 illustrates a base station and a user equipment that can be applied to an exemplary embodiment of the present invention.

In case a relay is included in a wireless communication system, in a backhaul link, communication is established between the base station and the relay, and, in an access link, communication is established between the relay and the user equipment. Therefore, the base station or the user equipment, which are presented as examples in the drawing, may be replaced with the relay in accordance with the corresponding circumstances.

Referring to FIG. 25, a wireless communication device includes a base station (BS, 110) and a user equipment (UE, 120). The base station (110) includes a processor (112), a memory (114), and a Radio Frequency (RF) unit (116). The processor (112) may be configured to realize the procedures and/or methods, which are proposed in the present invention. The memory (114) is connected to the processor (112) and stores diverse information related to the operations of the processor (112). The RF unit (116) is connected to the processor (112) and transmits and/or receives radio signals. The user equipment (120) includes a processor (122), a memory (124), and a RF unit (126). The processor (122) may be configured to realize the procedures and/or methods, which are proposed in the present invention. The memory (124) is connected to the processor (122) and stores diverse information related to the operations of the processor (122). The RF unit (126) is connected to the processor (122) and transmits and/or receives radio signals. The base station (110) and/or the user equipment (120) may have a single antenna or multiple antennae.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

In this document, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. The term base station may be replaced by other terms, such as fixed station, Node B, eNode B (eNB), Access Point (AP), and so on.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor.

The memory may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

The present invention may be used in a wireless communication apparatus, such as a user equipment, a relay, a base station, and so on.

The invention claimed is:
1. A method of transmitting channel state information (CSI) about a plurality of base stations in a wireless communication system, the method performed by a user equipment and comprising:

receiving, by the user equipment, N CSI configurations for CSI reporting for the plurality of base stations from a base station among the plurality of base stations;

receiving, by the user equipment, information indicating M CSI configurations using a same subband, a same rank indicator, and a same precoding matrix indicator among the N CSI configurations from the base station among the plurality of base stations, wherein N and M are integers and 2≤M<N;

determining, by the user equipment, a first CSI configuration among the M CSI configurations to be used for generating a first CSI based on CSI configuration indexes of the M CSI configurations;

generating, by the user equipment, the first CSI according to the first CSI configuration, wherein the first CSI configuration has a lowest CSI configuration index among the indicated M CSI configurations;

generating, by the user equipment, at least one second CSI according to at least one second CSI configuration, wherein the at least one second CSI configuration is all CSI configurations other than the indicated M CSI configurations among the N CSI configurations;

generating, by the user equipment, a concatenated CSI by concatenating the first CSI and the at least one second CSI in an ascending order of CSI configuration indexes of the first CSI and the at least one second CSI; and transmitting, by the user equipment, the concatenated CSI to the base station among the plurality of base stations, wherein the first CSI in the concatenated CSI is a feedback for all of the indicated M CSI configurations.

2. A user equipment for transmitting channel state information (CSI) about a plurality of base stations in a wireless communication system, the user equipment comprising:

a transceiver configured to transceive signals; and a processor configured to:

control the transceiver to receive N CSI configurations for CSI reporting for the plurality of base stations from a base station among the plurality of base stations, control the transceiver to receive information indicating M CSI configurations using a same subband, a same rank indicator, and a same precoding matrix indicator among the N CSI configurations from the base station among the plurality of base stations, wherein N and M are integers and 2≤M<N, determine a first CSI configuration among the M CSI configurations to be used for generating a first CSI based on CSI configuration indexes of the M CSI configurations, generate a first CSI according to a first CSI configuration, wherein the first CSI configuration has a lowest CSI configuration index among the indicated M CSI configurations, generate at least one second CSI according to at least one second CSI configuration, wherein the at least one second CSI configuration is all CSI configurations other than the indicated M CSI configurations among the N CSI configuration, generate a concatenated CSI by concatenating the first CSI and the at least one second CSI in an ascending order of CSI configuration indexes of the first CSI and the at least one second CSI, and control the transceiver to transmit the concatenated CSI to the base station among the plurality of base stations, wherein the first CSI in the concatenated CSI is a feedback for all of the indicated M CSI configurations.

3. A method of receiving channel state information (CSI) about a plurality of base stations in a wireless communication system, the method performed by a base station and comprising:

transmitting, by the base station, N CSI configurations for CSI reporting for the plurality of base stations to a user equipment;

transmitting, by the base station, information indicating M CSI configurations using a same subband, a same rank indicator, and a same precoding matrix indicator among the N CSI configurations to the user equipment;

receiving, by the base station, a concatenated CSI from the user equipment, wherein N and M are integers and 2≤M<N, wherein a first CSI configuration among the M CSI configuration is determined based on CSI configuration indexes of the M CSI configurations, wherein the concatenated CSI includes a first CSI and at least one second CSI concatenated in an ascending order of CSI configuration indexes of the first CSI and the at least one second CSI, wherein the first CSI is generated according to the first CSI configuration, wherein the first CSI configuration has a lowest CSI configuration index among the indicated M CSI configurations, wherein the at least one second CSI is generated according to at least one second CSI configuration, wherein the at least one second CSI configuration is all CSI configurations other than the indicated M CSI configurations among the N CSI configurations, and wherein the first CSI in the concatenated CSI is a feedback for all of the indicated M CSI configurations.

4. A base station for receiving channel state information (CSI) about a plurality of base stations in a wireless communication system, the base station comprising:

a transceiver configured to transceive signals; and a processor configured to:

control the transceiver to transmit N CSI configurations for CSI reporting for the plurality of base stations to a user equipment, control the transceiver to transmit information indicating M CSI configurations using a same subband, a same rank indicator, and a same precoding matrix indicator among the N CSI configurations to the user equipment, and control the transceiver to receive a concatenated CSI from the user equipment, wherein N and M are integers and 2≤M<N, wherein a first CSI configuration among the M CSI configuration is determined based on CSI configuration indexes of the M CSI configurations, wherein the concatenated CSI includes a first CSI and at least one second CSI concatenated in an ascending order of CSI configuration indexes of the first CSI and the at least one second CSI, wherein the first CSI is generated according to the first CSI configuration, wherein the first CSI configuration has a lowest CSI configuration index among the indicated M CSI configurations, wherein the at least one second CSI is generated according to at least one second CSI configuration, wherein the at least one second CSI configuration is all CSI configurations other than the indicated M CSI configurations among the N CSI configurations, and wherein the first CSI in the concatenated CSI is a feedback for all of the indicated M CSI configurations.

* * * * *